US012490903B2

(12) United States Patent
Perkins et al.

(10) Patent No.: US 12,490,903 B2
(45) Date of Patent: Dec. 9, 2025

(54) DERMAL IMAGE CAPTURE

(71) Applicant: Welch Allyn, Inc., Skaneateles Falls, NY (US)

(72) Inventors: David G. Perkins, Tully, NY (US); Yaolong Lou, Singapore (SG); Shadakshari D. Chikkanaravangala, Singapore (SG); Stephen C. Daley, Skaneateles, NY (US); Helmi Kurniawan, Singapore (SG); Chee Keen Lai, Singapore (SG); Hon Kuen Leong, Singapore (SG); Bryan Ng, Singapore (SG)

(73) Assignee: Welch Allyn, Inc., Skaneateles Falls, NY (US)

( * ) Notice: Subject to any disclaimer, the term of this patent is extended or adjusted under 35 U.S.C. 154(b) by 848 days.

(21) Appl. No.: 17/369,099

(22) Filed: Jul. 7, 2021

(65) Prior Publication Data

US 2022/0047165 A1 Feb. 17, 2022

Related U.S. Application Data

(60) Provisional application No. 63/064,537, filed on Aug. 12, 2020.

(51) Int. Cl.
*A61B 5/00* (2006.01)
*G06T 5/30* (2006.01)
(Continued)

(52) U.S. Cl.
CPC ............ *A61B 5/0077* (2013.01); *A61B 5/444* (2013.01); *G06T 5/30* (2013.01); *G06T 7/0012* (2013.01);
(Continued)

(58) Field of Classification Search
CPC ..... A61B 5/0077; A61B 5/444; A61B 5/6898; A61B 5/004; A61B 5/7221; A61B 5/726;
(Continued)

(56) References Cited

U.S. PATENT DOCUMENTS 3,653,767 A * 4/1972 Liskowitz .......... B22D 11/0602
356/336
4,238,772 A * 12/1980 von Gierke ............. H04N 5/14
348/629

(Continued)

FOREIGN PATENT DOCUMENTS

WO 2019243214 A1 12/2019
WO 2020102442 A1 5/2020

OTHER PUBLICATIONS

Kim, et al., "Smartphone-based multispectral imaging and machine-learning based analysis for discrimination between seborrheic dermatitis and psoriasis on the scalp," Biomed. Opt. Express 10, 879-891 (2019) (Year: 2019).*

(Continued)

*Primary Examiner* — Charles A Marmor, II
*Assistant Examiner* — Andrew E Hoffpauir
(74) *Attorney, Agent, or Firm* — Merchant & Gould P.C.

(57) ABSTRACT

A dermal imaging system coordinates operation of an illumination unit, one or more lenses, and a camera to capture a sequence of images of an area of interest on a skin surface. The system automatically tags each image in the sequence of images. The tag for each image identifies a light source, an illumination angle, and a filter selected for capturing the image. The system automatically selects at least one image from the sequence of images, and analyzes the selected image from the sequence of images to provide a recommended skin disease diagnosis.

10 Claims, 26 Drawing Sheets

(51) Int. Cl.
| | |
|---|---|
| *G06T 7/00* | (2017.01) |
| *G06T 7/11* | (2017.01) |
| *G06T 7/40* | (2017.01) |
| *G06T 7/50* | (2017.01) |
| *G06T 7/90* | (2017.01) |
| *H04N 23/74* | (2023.01) |

(52) U.S. Cl.
CPC .................. *G06T 7/11* (2017.01); *G06T 7/40* (2013.01); *G06T 7/50* (2017.01); *G06T 7/90* (2017.01); *H04N 23/74* (2023.01); *A61B 5/6898* (2013.01); *A61B 2576/02* (2013.01); *G06T 2207/10016* (2013.01); *G06T 2207/10036* (2013.01); *G06T 2207/20081* (2013.01); *G06T 2207/30088* (2013.01); *G06T 2207/30168* (2013.01)

(58) Field of Classification Search
CPC .............. A61B 5/0075; A61B 2576/02; A61B 2576/00; G06T 5/30; G06T 7/0012; G06T 7/11; G06T 7/40; G06T 7/50; G06T 7/90; G06T 2207/10016; G06T 2207/10036; G06T 2207/20081; G06T 2207/30088; G06T 2207/30168; G06T 2207/10152; G06T 2207/30096; H04N 23/74
USPC .......................................... 382/128; 702/2, 3
See application file for complete search history.

(56) References Cited

U.S. PATENT DOCUMENTS

| | | | | |
|---|---|---|---|---|
| 6,031,930 | A * | 2/2000 | Bacus ................. | G01N 15/1433 382/284 |
| 6,283,596 | B1 | 9/2001 | Yoshimura et al. | |
| 6,417,562 | B1 * | 7/2002 | Watkins ......... | G01R 31/318314 257/690 |
| 9,075,003 | B2 | 7/2015 | Oe et al. | |
| 9,414,780 | B2 | 8/2016 | Rhoads | |
| 9,848,767 | B2 | 12/2017 | Miyashita et al. | |
| 10,085,643 | B2 | 10/2018 | Bandic et al. | |
| 10,349,830 | B2 | 7/2019 | Durr et al. | |
| 10,376,142 | B2 | 8/2019 | Dirghangi et al. | |
| 2004/0092802 | A1 | 5/2004 | Cane et al. | |
| 2004/0264749 | A1 * | 12/2004 | Skladnev ............. | A61B 5/0059 382/128 |
| 2005/0030372 | A1 * | 2/2005 | Jung .................... | A61B 5/0059 348/77 |
| 2005/0195316 | A1 | 9/2005 | Kollias et al. | |
| 2007/0139549 | A1 * | 6/2007 | Kato ........................ | H04N 5/58 348/E5.029 |
| 2007/0165241 | A1 * | 7/2007 | Laguart Bertran ...... | G01B 9/04 356/497 |
| 2007/0278505 | A1 * | 12/2007 | Yamamoto .............. | H01L 33/20 257/E33.001 |
| 2008/0194928 | A1 * | 8/2008 | Bandic ................... | A61B 5/443 600/306 |
| 2010/0185064 | A1 | 7/2010 | Bandic et al. | |
| 2011/0170755 | A1 * | 7/2011 | Buelow ................. | G06T 7/0012 382/128 |
| 2013/0064531 | A1 * | 3/2013 | Pillman ................... | H04N 23/56 396/62 |
| 2014/0313303 | A1 | 10/2014 | Davis et al. | |
| 2014/0348410 | A1 | 11/2014 | Grunkin et al. | |
| 2015/0006574 | A1 * | 1/2015 | Saalbach ................ | G16H 30/20 707/772 |
| 2015/0036311 | A1 * | 2/2015 | Mullani ............... | A61B 5/0077 362/230 |
| 2015/0264337 | A1 * | 9/2015 | Venkataraman ..... | H04N 13/271 348/47 |
| 2015/0327765 | A1 * | 11/2015 | Crane .................... | A61B 5/489 348/77 |
| 2016/0069743 | A1 * | 3/2016 | McQuilkin ............ | A22B 5/007 356/416 |
| 2017/0067781 | A1 | 3/2017 | Darty et al. | |
| 2017/0124689 | A1 * | 5/2017 | Doba ..................... | H04N 23/62 |
| 2017/0124709 | A1 | 5/2017 | Rithe et al. | |
| 2017/0150888 | A1 | 6/2017 | Millikan | |
| 2017/0212739 | A1 * | 7/2017 | Catiller ............... | G06F 15/7889 |
| 2017/0224270 | A1 * | 8/2017 | Stamnes .............. | G06V 30/142 |
| 2017/0303790 | A1 | 10/2017 | Bala et al. | |
| 2017/0307524 | A1 | 10/2017 | Sorgato et al. | |
| 2018/0176488 | A1 | 6/2018 | Dvir | |
| 2018/0202935 | A1 * | 7/2018 | Bahlman ............ | G02B 21/0076 |
| 2019/0038135 | A1 * | 2/2019 | Lee .......................... | A61B 3/12 |
| 2020/0202527 | A1 * | 6/2020 | Choi ...................... | A61B 5/021 |
| 2021/0059533 | A1 * | 3/2021 | Patwardhan ......... | G02B 27/281 |

OTHER PUBLICATIONS

Qinghua He and Ruikang Wang, "Hyperspectral imaging enabled by an unmodified smartphone for analyzing skin morphological features and monitoring hemodynamics," Biomed. Opt. Express 11, 895-910 (2020) (Year: 2020).*

European Search Report, EP Application No. 21189309.4, dated Dec. 23, 2021, 8 pages.

"Handyscope Turns iPhone Into Professional Dermatoscope", Medgadget, https://www.medgadget.com/2011/01/handyscope_turns_iphone_into_professional_dermatoscope.html, Jan. 21, 2011.

"DermLite HÜD / Smartphone Home Dermatoscope—3Gen", https://dermlite.com/products/dermlite-hud, Accessed Jul. 7, 2020.

"CASH Algorithm for Dermoscopy Revisited", American Medical Association, Arch Dermatol. vol. 44, No. 4, pp. 554-555, Apr. 2008.

"Dermoscopy Other algorithms for melanocytic lesions", https://dermnetnz.org/cme/dermoscopy-course/other-algorithms-for-melanocytic-lesions/, 2008.

Stolz, et al., "ABCD Rule," Eur. J. Dermatol, 1994 Dermoscopy, www.dermoscopy.org/consensus/2b.asp., Accessed Jul. 8, 2020.

Argenziano, G., et al., "Seven Point Checklist", Dermoscopedia, htlps://dermoscopedia.org/w/index.php?title=Seven_Point_Checklist&oldid=16766, last edited Jul. 6, 2019.

Stolz, W., et al., "ABCD rule", Dermoscopedia, htlps://dermoscopedia.org/w/index.php?title=ABCD_rule&oldid=15572, last edited Apr. 24, 2019.

"Three-point checklist", Dermoscopy, DermNet NZ, https://dermnetnz.org/cme/dermoscopy-course/three-point-checklist/, 2008.

Australian Second Exam Report in Application 2023200060, mailed Mar. 5, 2024, 6 pgs.

* cited by examiner

DERMAL IMAGE CAPTURE

BACKGROUND

Melanoma is a common type of skin cancer that develops from pigment-producing cells. The primary cause of melanoma is ultraviolet light (UV) exposure. The UV light may be from the sun or other sources, such as tanning devices. Those with many moles, a history of affected family members, and poor immune function are at greater risk for melanoma.

In certain instances, melanomas develop from skin lesions such as moles. Changes in a mole over time including an increase in size, irregular edges, color, itchiness, or skin breakdown can indicate melanoma. Treatment of melanoma is typically removal by surgery.

Despite the prevalence of melanoma, there is a shortage of dermatologists. Thus, melanoma screening is often initially conducted in a primary care physician's office. However, primary care physicians typically lack the experience and knowledge of a specialist such as a dermatologist, which can lead to misdiagnosis and cause delay in treatment of melanoma.

SUMMARY

In general terms, the present disclosure relates to a dermal imaging system. In one possible configuration, the dermal imaging system provides a technical effect by capturing a sequence of images under different lighting and optical conditions that can be analyzed by computer-aided algorithms to provide a recommended diagnosis. Various aspects are described in this disclosure, which include, but are not limited to, the following aspects.

One aspect relates to a dermal imaging system. The system comprises a controller configured to control the operation of a camera, an illumination unit, and one or more lenses, the controller having at least one processor, and a memory storing instructions which, when executed by the at least one processor, cause the system to: coordinate operation of the illumination unit, the one or more lenses, and the camera to capture a sequence of images of an area of interest on a skin surface; automatically tag each image in the sequence of images, the tag for each image identifying a light source and illumination angle selected from the illumination unit for capturing the image, and further identifying a filter selected for capturing the image; automatically select at least one image from the sequence of images; and analyze the selected image from the sequence of images to provide a recommended skin disease diagnosis.

Another aspect relates to a method of skin disease screening. The method comprises capturing an image of a skin surface using a selected combination of light source wavelength, light source illumination angle, and optical effect; tagging the image with identifiers that identify the selected combination of the light source, the illumination angle, and the filter used to capture the image; analyzing the image using one or more computer-aided algorithms to provide a recommended skin disease diagnosis; and tagging the image and the recommended skin disease diagnosis with a patient identifier.

Another aspect relates to a method of performing skin disease screening. The method comprises capturing an image of a skin surface with a pre-selected combination of light wavelength, lens magnification, and filtering, the skin surface including an area of interest; preprocessing the captured image of the skin surface; segmenting the preprocessed image by identifying boundaries between the area of interest and the skin surface, and partitioning the area of interest from the skin surface; extracting features from the segmented image; and providing a recommended skin disease diagnosis of the area of interest by performing one or more computer-aided algorithms that use the extracted features as inputs.

DESCRIPTION OF THE FIGURES

The following drawing figures, which form a part of this application, are illustrative of the described technology and are not meant to limit the scope of the disclosure in any manner.

DETAILED DESCRIPTION

Figure 1:
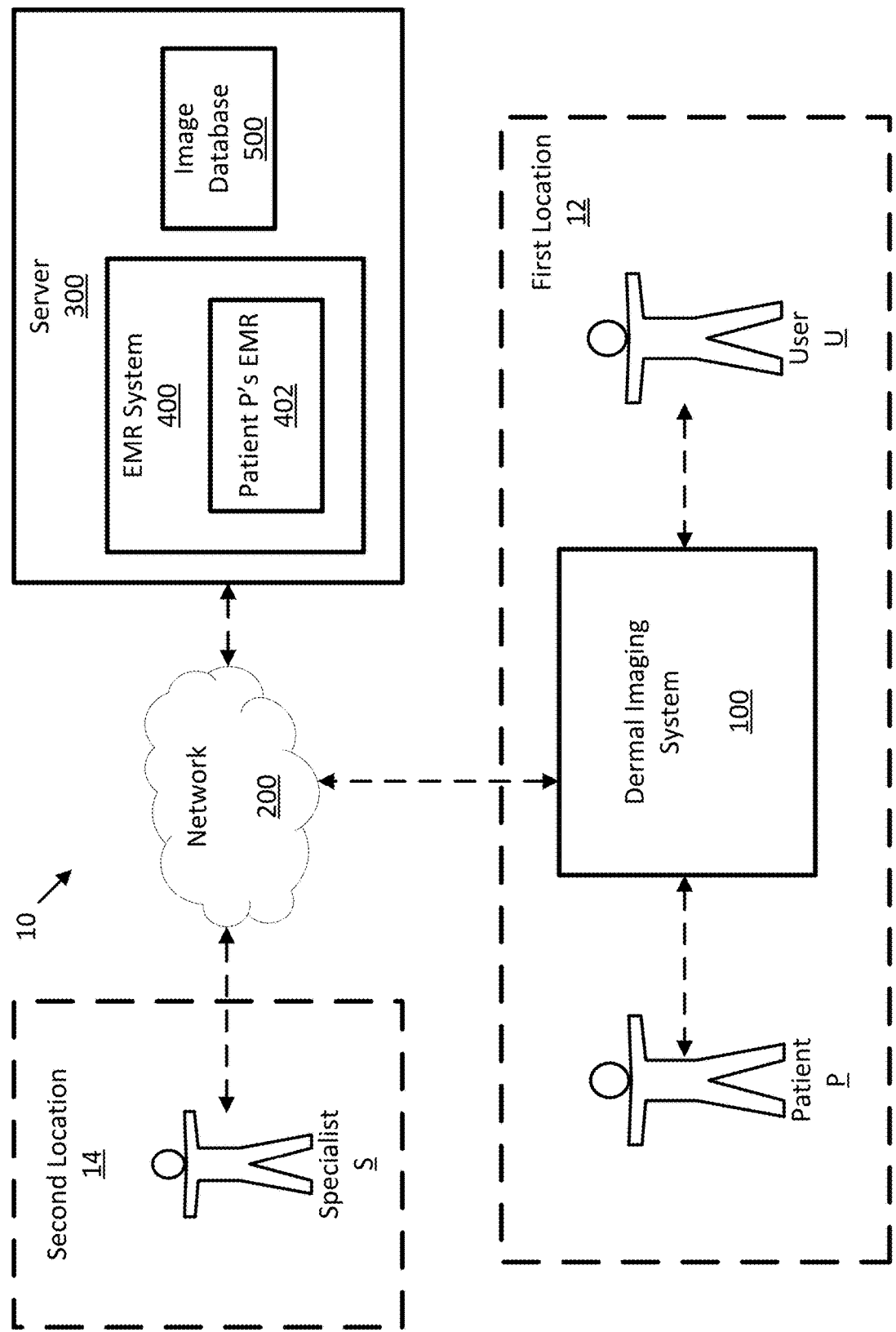
FIG. 1 schematically illustrates an imaging environment including a network that connects a dermal imaging system with a remotely located specialist and server.

FIG. 1 schematically illustrates an imaging environment 10 including a network 200 that connects a dermal imaging system 100 with a specialist S and a server 300. The dermal imaging system 100 is used by a user U to capture images of the skin of a patient P. In some examples, the user U is a nurse, technician, family member, patient, or physician who does not specialize in dermatology such as a general practitioner or primary care physician. In some examples, the user of the dermal imaging system 100 is the patient P him/herself such that the patient P uses the dermal imaging system 100 to capture images of his or her skin.

In some examples, the specialist S is a medical professional who specializes in diseases related to skin, hair, and nails such as a dermatologist. As shown in FIG. 1, the patient P, user U, and dermal imaging system 100 are located in a first location 12, while the specialist S is remotely located in a second location 14. As an illustrative example, the first location 12 can be a primary care physician's office, an emergency room (ER) of a hospital, a medical clinic, a long-term-care facility, a nursing home, or other type of facility, while the second location 14 is a dermatologist's office. As another illustrative example, the first location 12 can be the patient P's home, while the second location 14 is a dermatologist's office.

The network 200 can include any type of wired or wireless connection or any combinations thereof. Examples of wireless connections can include, without limitation, digital cellular network connections such as 5G.

The images of the patient P's skin that are captured by the dermal imaging system 100 can be sent directly from the dermal imaging system 100 to the specialist S via the network 200. For example, the images can be sent through the network 200 via email, instant message, or cloud sharing. Alternatively, or in combination with sending the captured images directly to the specialist S, the captured images of the patient P's skin can be sent via the network 200 from the dermal imaging system 100 to the server 300. Like the specialist S, the server 300 is remotely located from the patient P, user U, and dermal imaging system 100. In some examples, the server 300 is also remotely located with respect to the specialist S. Subsequently, the specialist S can access the images of the patient P's skin from the server 300 using the network 200.

In certain embodiments, the server 300 includes an electronic medical record system 400 (alternatively termed electronic health record, EMR/EHR). Advantageously, the server 300 can store the captured images of the patient P's skin in an electronic medical record 402 or electronic health record of the patient P that is located in the EMR system 400.

In certain embodiments, the images of the patient P's skin can be saved in an image database 500. The skin images from other patients can also be saved in the image database 500, and can be used for machine learning to improve the computer-aided algorithms 2000, 2100, and 2200 that are described in more detail below with reference to FIGS. 20-22. As will be described in more detail below, the computer-aided algorithms 2000, 2100, and 2200 can be performed by the dermal imaging system 100 or server 300 to automatically provide a recommended diagnosis based on the captured images of the patient P's skin without requiring input from the user U.

In some embodiments, the skin images stored on the image database 500 are used for deep learning or artificial intelligence to improve the recommended diagnosis. In certain embodiments, the skin images stored on the image database 500 are processed to remove personally identifiable information such that they are not associated with a particular patient to comply with privacy rules for protected health information. In the image database 500, the skin images are associated with a diagnosis such as whether a certain image corresponds to a positive melanoma diagnosis, a negative melanoma diagnosis, or other positive or negative diagnoses such as basal cell carcinomas, squamous cell carcinomas, actinic keratosis, and the like.

Figure 2:
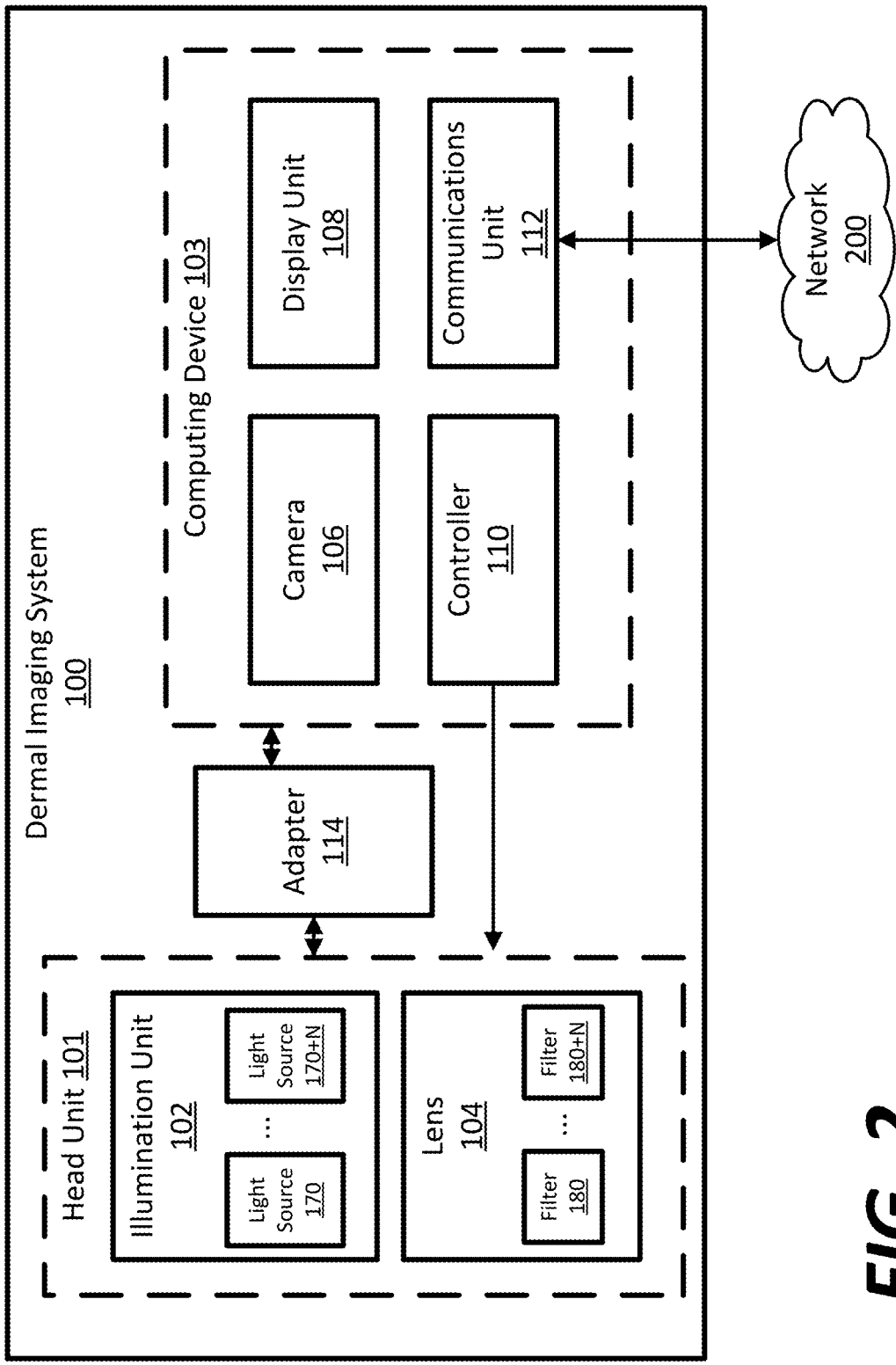
FIG. 2 schematically illustrates the dermal imaging system of FIG. 1.

FIG. 2 schematically illustrates the dermal imaging system 100. In the example embodiment depicted in FIG. 2, a head unit 101 detachably connects to a computing device 103 by an adapter 114. The head unit 101 includes an illumination unit 102 and a lens 104. In certain embodiments, the computing device 103 is a mobile computing device such as a smartphone or tablet computer that includes a camera 106, a display unit 108, a controller 110, and a communications unit 112. This example embodiment of the dermal imaging system 100 is shown in FIGS. 3-8 which will be described in more detail below.

The controller 110 is operatively coupled to the camera 106, display unit 108, and communications unit 112 to control and coordinate the operation of each of these components in the computing device 103. Additionally, when the head unit 101 is attached to the computing device 103, the controller 110 is operatively coupled to the illumination unit 102 and lens 104 to control and coordinate the operation of these components in the head unit 101. Other arrangements are possible in which the camera 106 is integrated with the head unit 101.

In certain embodiments, the controller 110 communicates with the head unit 101 through a wireless connection such as Bluetooth, Wi-Fi, RFID, NFC, ZigBee, and the like. In certain embodiments, it is contemplated that the controller 110 can communicate with the head unit 101 through an optical connection. For example, in certain embodiments, the illumination unit 102 of the head unit 101 can emit light signals that the camera 106 of the computing device 103 can pick up and interpret. Additional types of wireless, wired connections, or combinations thereof, between the controller 110 and head unit 101 are possible.

In certain embodiments, the controller 110 can perform a method that analyzes the captured images of the patient P's skin to provide a recommended skin diagnosis. Alternatively, the communications unit 112 can forward the captured images of the patient P's skin from the camera 106 to the server 300 via the network 200, and the server 300 can perform a method that analyzes the captured images of the patient P's skin to provide a recommended skin diagnosis.

The communications unit 112 is connected with the network 200 such that is able to transfer the captured images of the patient P's skin to another device or system, such as the server 300, or any computing device used by the specialist S in the second location 14. As described above, the network 200 can include any type of wired or wireless connection or any combinations thereof including digital cellular network connections such as 5G.

Figure 23:
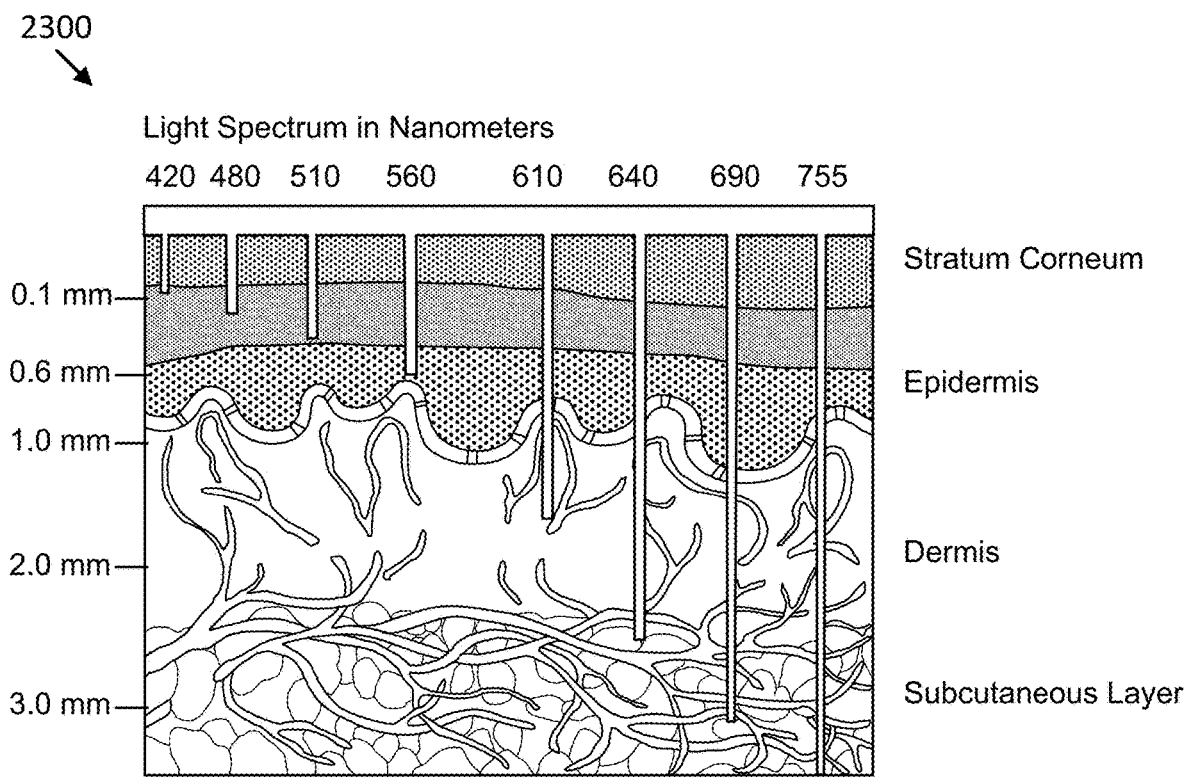
FIG. 23 illustrates a chart of the penetration of different wavelengths of light through various layers of skin.

The illumination unit 102 includes an array of light sources 170-170+N. Each light source emits light at a predetermined wavelength. Light penetration in the skin is different for different wavelengths. FIG. 23 illustrates a chart 2300 that shows the penetration of different light wavelengths through skin. The array of light sources 170-170+N can be controlled by the controller 110 to emit light at various wavelengths to perform multispectral imaging of an object or area of interest on the patient P's skin such as a mole to identify one or more features at various depths through the mole. In certain embodiments, the light sources 170-170+N include light-emitting diodes (LEDs). It is contemplated that the array of light sources 170-170+N may also include additional types of light sources such as lasers, as well as other optical lamps.

The controller 110 can control the array of light sources 170-170+N such that certain light sources emit light while other light sources are disabled. For example, the controller 110 can control the array of light sources 170-170+N such that light is emitted on one side of an area of interest, while light is not emitted on an opposite side of the area of interest.

Additionally, the controller 110 can adjust the angle of the illuminated light from the array of light sources 170-170+N to highlight an object or area of interest on the skin surface such as a mole. Enabling the controller 110 to control the wavelength and angle of the light emitted from the array of light sources 170-170+N as well as selectively disabling certain light sources can improve the skin disease screening performed by the dermal imaging system 100 because an image capture sequence performed by the controller 110 can be tailored to a type of disease, or patient characteristics such as age, skin color, and other patient characteristics. Advantageously, the image capture sequence can result in more useful and clearer images of an area of interest for analysis by the one or more computer-aided algorithms described below.

Additionally, the lens 104 can include a plurality of filters 180-180+N to apply different optical effects on the images of the patient P's skin captured by the dermal imaging system 100. The controller 110 can select and apply any filter from the plurality of filters 180-180+N during image capture. For example, the filters 180-180+N can include polarizers that are used in combination with additional types of filters over at least some of the light sources 170-170+N. Advantageously, the controller 110 can selectively apply the filters 180-180+N to capture images of the patient P's skin with or without polarization. The plurality of filters 180-180+N may include, without limitation, a linear polarizer, a crossed polarizer, a circular polarizer, a red-free filter, a high-contrast filter, and the like.

Also, the controller 110 can control the focus of the lens 104 and adjust the diopter of the lens 104 during image capture. Thus, the dermal imaging system 100 can capture images of the patient P's skin at different diopters to highlight different features and depths of the skin.

Each wavelength of light from the array of light sources 170-170+N and filter from the plurality of filters 180-180+N can provide different and useful information. For example, the selective application of the light sources and filters during image capture by the dermal imaging system 100 can be used to highlight different features on the patient P's skin for analysis by the one or more computer-aided algorithms described in more detail below.

Figure 3:
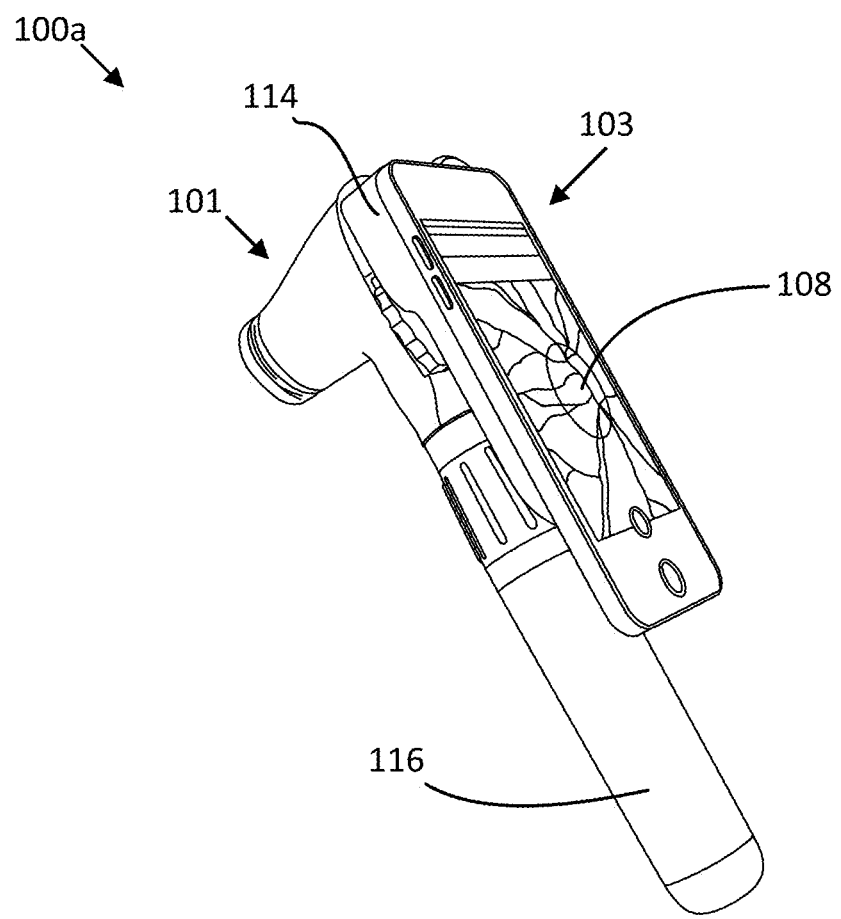
FIG. 3 is an isometric view of an embodiment of the dermal imaging system that includes a head unit that detachably mounts to a computing device.
Figure 4:
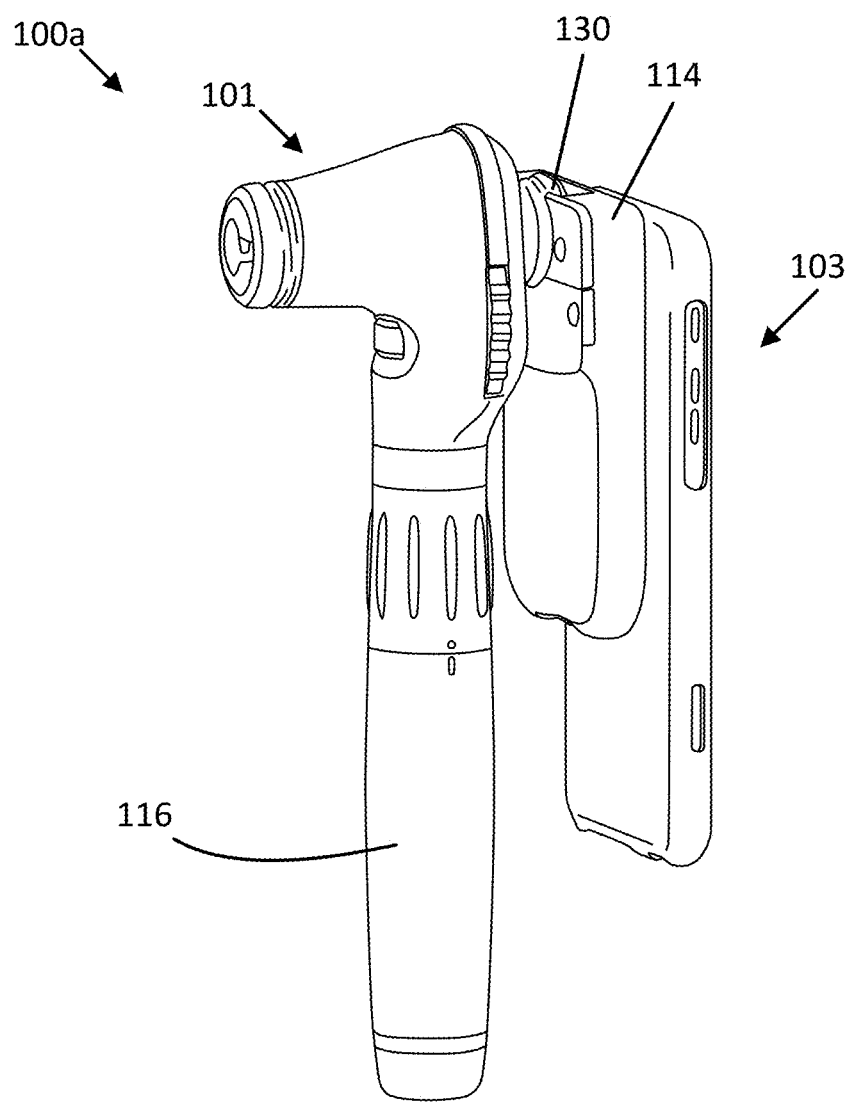
FIG. 4 is another isometric view of the dermal imaging system of FIG. 3.

FIGS. 3 and 4 are isometric views of an embodiment of the dermal imaging system 100a that includes the head unit 101 as a device separate from the computing device 103, and that detachably mounts to the computing device 103 via the adapter 114. The head unit 101 includes a handle 116 that can be conveniently grasped by the user U when using the computing device 103 to capture images of the patient P's skin. In certain embodiments, the handle 116 is a universal handle that is configurable for use with additional types of diagnostic devices and tools such as, for example, ophthalmoscopes and otoscopes.

In this embodiment, the computing device 103 is a smartphone such as an iPhone or Android device such that the display unit 108 is a finger-operated touchscreen that can be used by the user U to capture and view images of the patient P's skin. The camera 106 of the smartphone is used capture images of the patient P's skin, and the smartphone controls the illumination unit 102 and lens 104 of the head unit 101 when capturing the images. As described above, the smartphone can wirelessly communicate with the head unit 101 such as through Bluetooth, or similar wireless communication protocols, to control the operation of the illumination unit 102 and lens 104 of the head unit 101.

Figure 5:
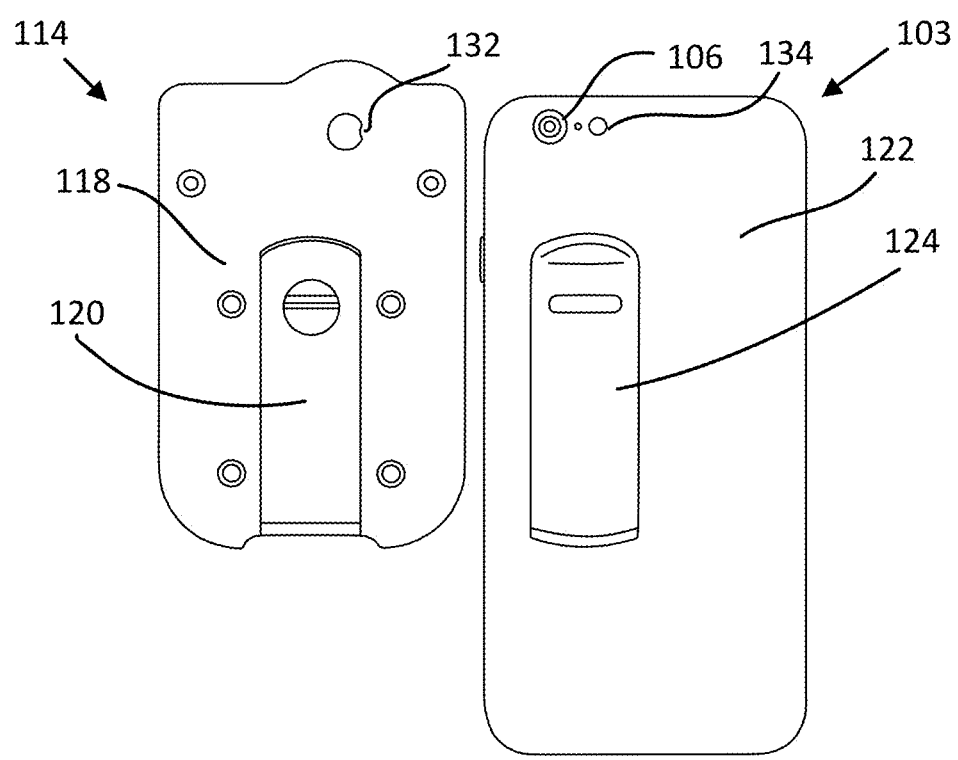
FIG. 5 is a rear view of an adapter that detachably mounts the head unit to the computing device in the embodiment of the dermal imaging system of FIG. 3.

FIG. 5 is a rear view of the adapter 114 and computing device 103 of FIGS. 3 and 4. Referring now to FIG. 5, the adapter 114 includes a port 120 on a rear surface 118 that mechanically mates with a joint 124 attached to a rear surface 122 of the computing device 103. The joint 124 can attach to the rear surface 122 by an adhesive such as tape or glue, or other suitable material that can provide a non-permanent bond between the joint 124 and the rear surface 122. Once the joint 124 is attached to the rear surface 122 of the computing device 103, the joint 124 can mechanically mate with the port 120 of the adapter 114 to mechanically couple the adapter 114 to the computing device 103.

Figure 6:
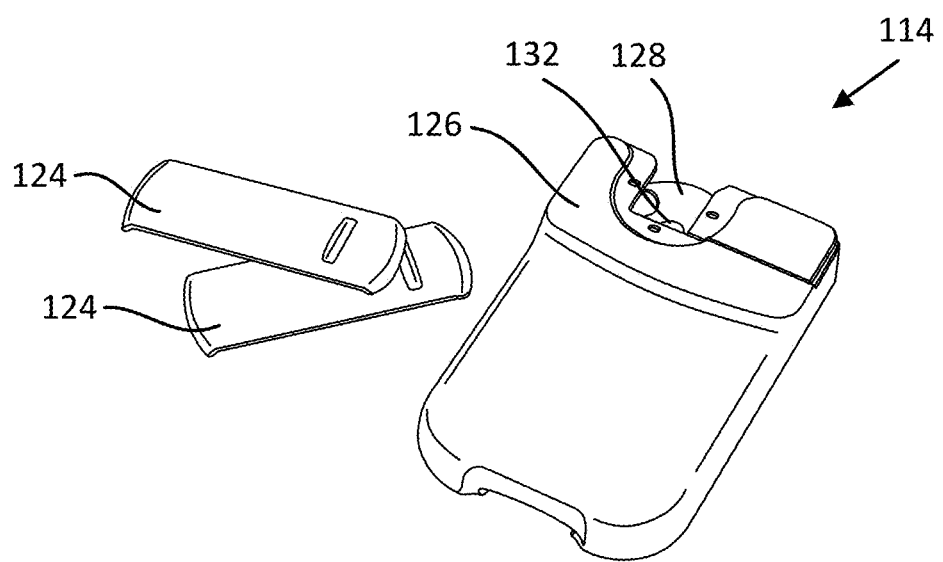
FIG. 6 is a front view of the adapter of FIG. 5.

FIG. 6 is a front view of the adapter 114. Referring now to FIGS. 5 and 6, the adapter 114 includes a port 128 on a front surface 126 that can mate with a joint 130 of the head unit 101 (see FIG. 4) to mechanically couple the head unit 101 to the adapter 114. The adapter 114 has an optical pathway 132 (see FIG. 5) that optically connects the lens 104 of the head unit 101 with the camera 106 of the computing device 103. Thus, when the head unit 101 is coupled to the computing device 103 via the adapter 114, the lens 104 and camera 106 are aligned and optically connected such that light can enter through the lens 104 and reach the camera 106.

During image capture, operation of the illumination unit 102 and lens 104 of the head unit 101 are coordinated with that of the camera 106 of the computing device 103 to capture dermal images under various light conditions and optical filters including various light wavelengths, lens diopters, and polarizations. As described above, the controller 110 can selectively apply one or more light sources and filters during image capture by the dermal imaging system 100 to highlight different features on the patient P's skin for analysis by the one or more computer-aided algorithms described in more detail below.

A flash 134 of the computing device 103 (see FIG. 5) can be disabled during image capture. Accordingly, only the array of light sources 170-170+N in the illumination unit 102 of the head unit 101 are used to illuminate the patient P's skin during image capture.

Figure 7:
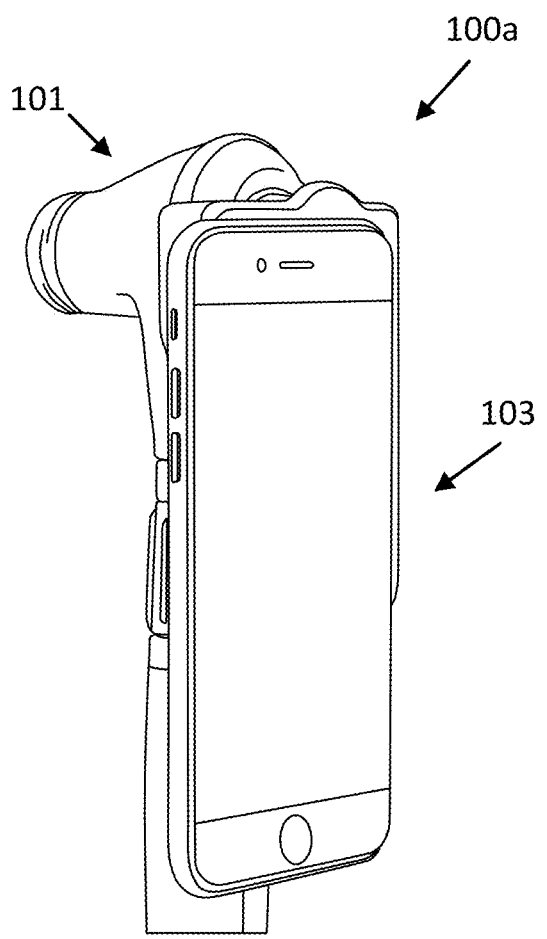
FIG. 7 is an isometric view of the embodiment of the dermal imaging system of FIG. 3, the computing device shown in a vertical position relative to the head unit.
Figure 8:
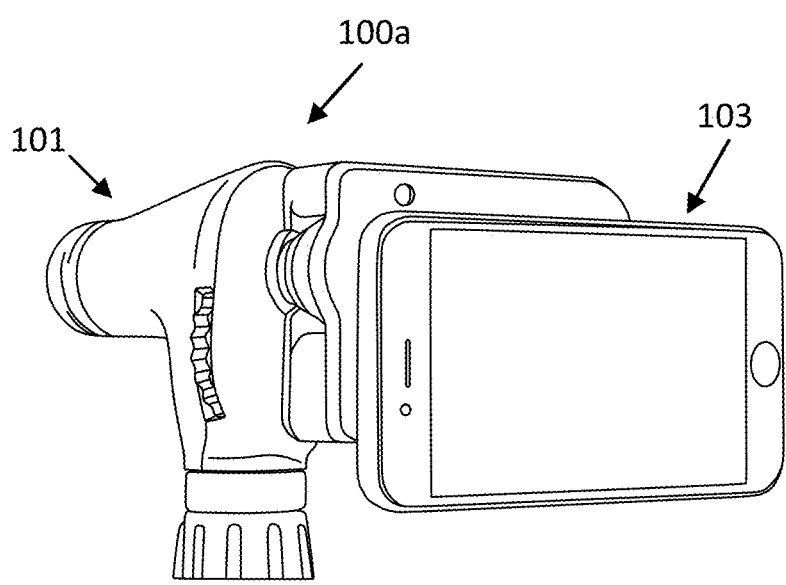
FIG. 8 is an isometric view of the embodiment of the dermal imaging system of FIG. 3, the computing device shown in a horizontal position relative to the head unit.

The head unit 101 and computing device 103 are rotatable with respect to one another when mechanically coupled together by the adapter 114. For example, FIG. 7 shows the computing device 103 in a vertical position relative to the head unit 101, while FIG. 8 shows the computing device 103 in a horizontal position relative to the head unit 101. Additional intermediate positions and more refined rotational adjustments between the vertical and horizontal positions shown in FIGS. 7 and 8 are possible. Throughout the various positions that are possible between the computing device 103 and head unit 101, the alignment and optical connection of the lens 104 and camera 106 is maintained. The relative positioning between the head unit 101 and computing device 103 can improve the ergonomics of the dermal imaging system 100a to reduce human error, increase productivity, and enhance safety and comfort.

In certain embodiments, the dermal imaging system 100 does not include the head unit 101 and computing device 103 as separate devices that attach together via the adapter 114, but rather the illumination unit 102, lens 104, camera 106, display unit 108, controller 110, and communications unit 112 are all integrated together in a single device. This alternative embodiment is shown in FIGS. 9-13 which will now be described in more detail.

Figure 9:
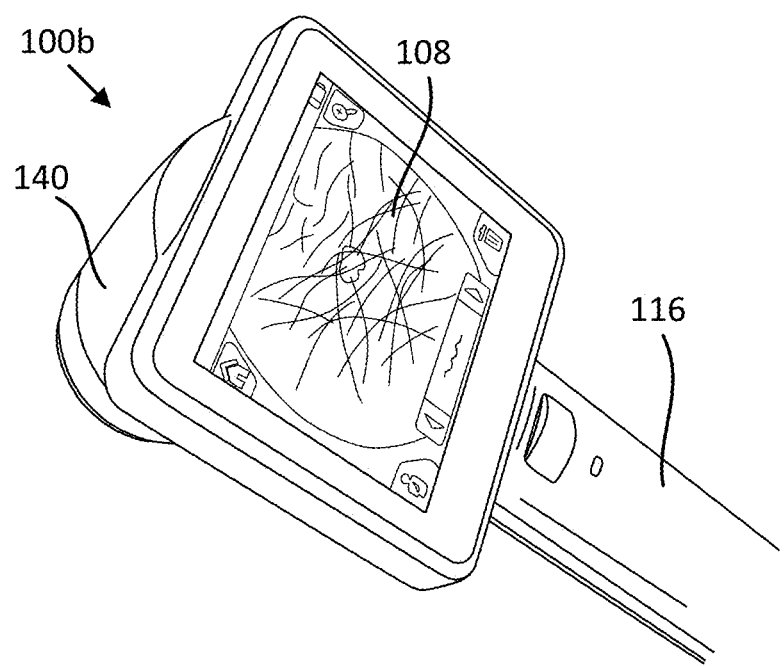
FIG. 9 is an isometric view of another embodiment of the dermal imaging system, the embodiment of the dermal imaging system is an integrated, single device.
Figure 10:
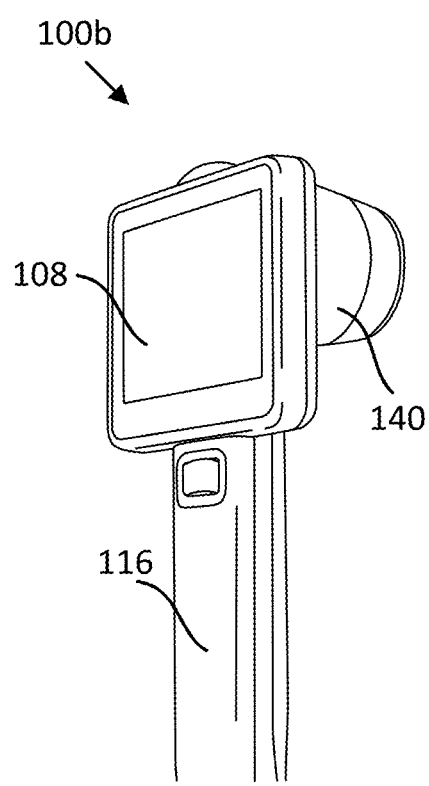
FIG. 10 is another isometric view of the dermal imaging system of FIG. 9.
Figure 11:
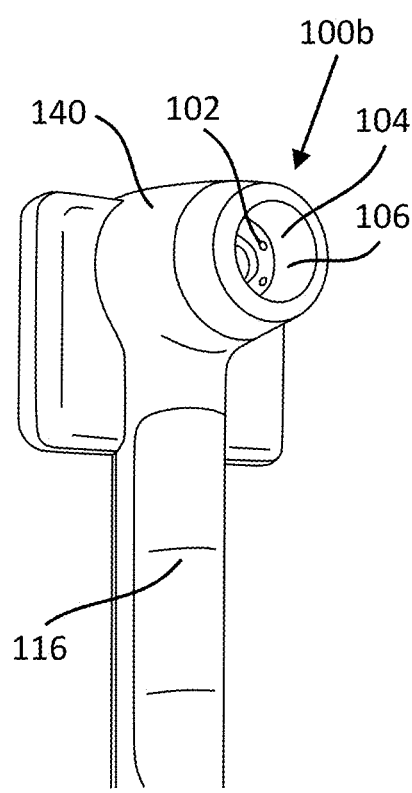
FIG. 11 is another isometric view of the dermal imaging system of FIG. 9.

FIGS. 9-11 show another embodiment of the dermal imaging system 100b that is an integrated device such that the functions of the head unit 101 and computing device 103 of the embodiment of FIGS. 3-8 are combined in a single device. The dermal imaging system 100b includes a handle 116 that can be conveniently grasped by the hand of the user U when using the dermal imaging system 100b to capture images of the patient P's skin. The dermal imaging system 100b includes a housing 140 attached to the handle 116 that houses the illumination unit 102, lens 104, and camera 106, and includes the display unit 108. In accordance with the description provided above with respect to FIG. 2, the dermal imaging system 100b also includes the controller 110 and communications unit 112.

Figure 12:
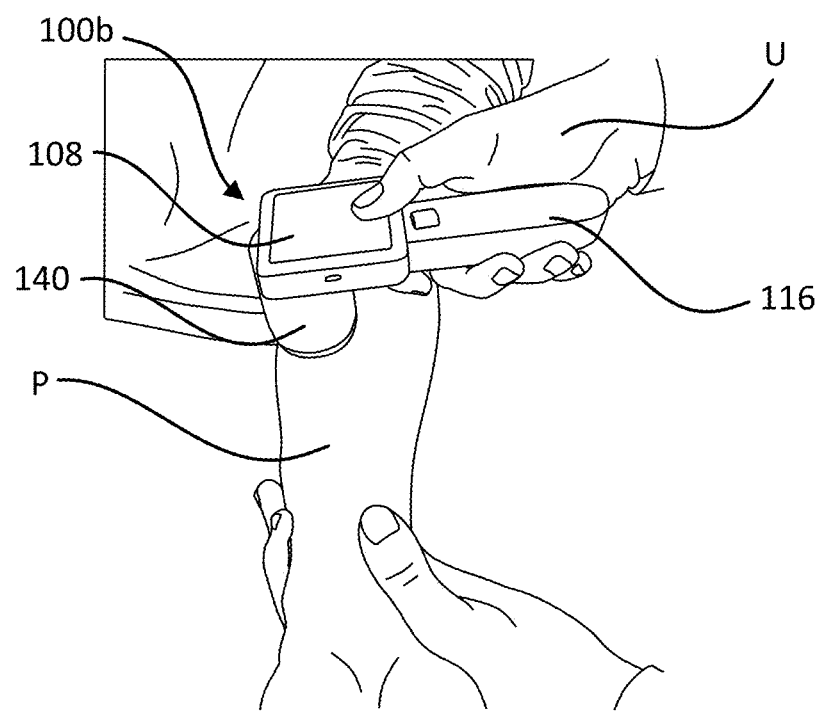
FIG. 12 shows an image of the dermal imaging system of FIG. 9 in use.
Figure 13:
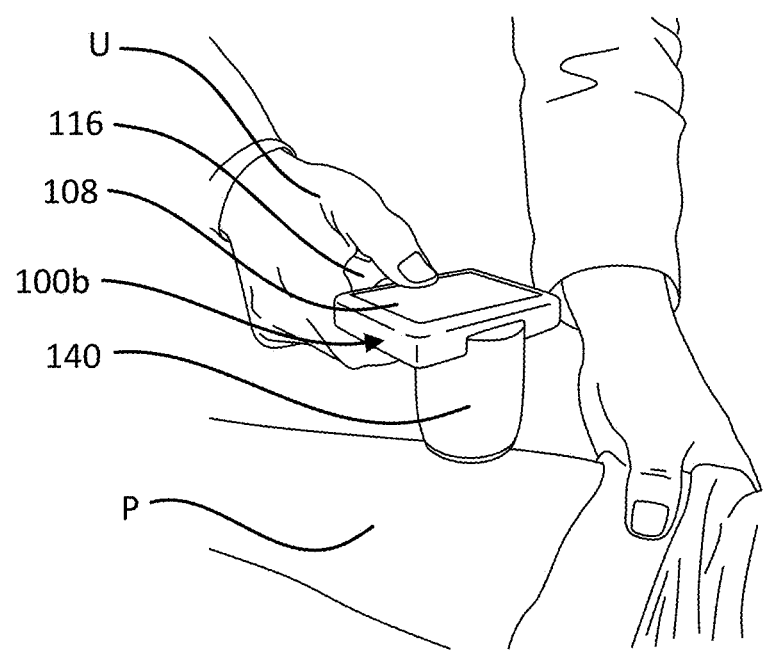
FIG. 13 shows another image of the dermal imaging system of FIG. 9 in use.

FIGS. 12 and 13 show images of the dermal imaging system 100b being used by the user U to capture an image of the patient P's skin. As shown in FIGS. 12 and 13, the user U can grasp the handle 116 of the dermal imaging system 100b and operate the display unit 108, which in this example is a finger-operated touchscreen, with their thumb to capture the images while the housing 140 is placed over a skin surface of interest such as on the patient P's forearm.

In some embodiments, auto-focus, auto-capture, and image quality algorithms are performed by the dermal imaging systems 100a, 100b of FIGS. 3-13 to improve digital image capture. Additionally, these features can enhance the ease of use of the dermal imaging systems 100a, 100b, and reduce the amount of training recommended for the user U.

Figure 14:
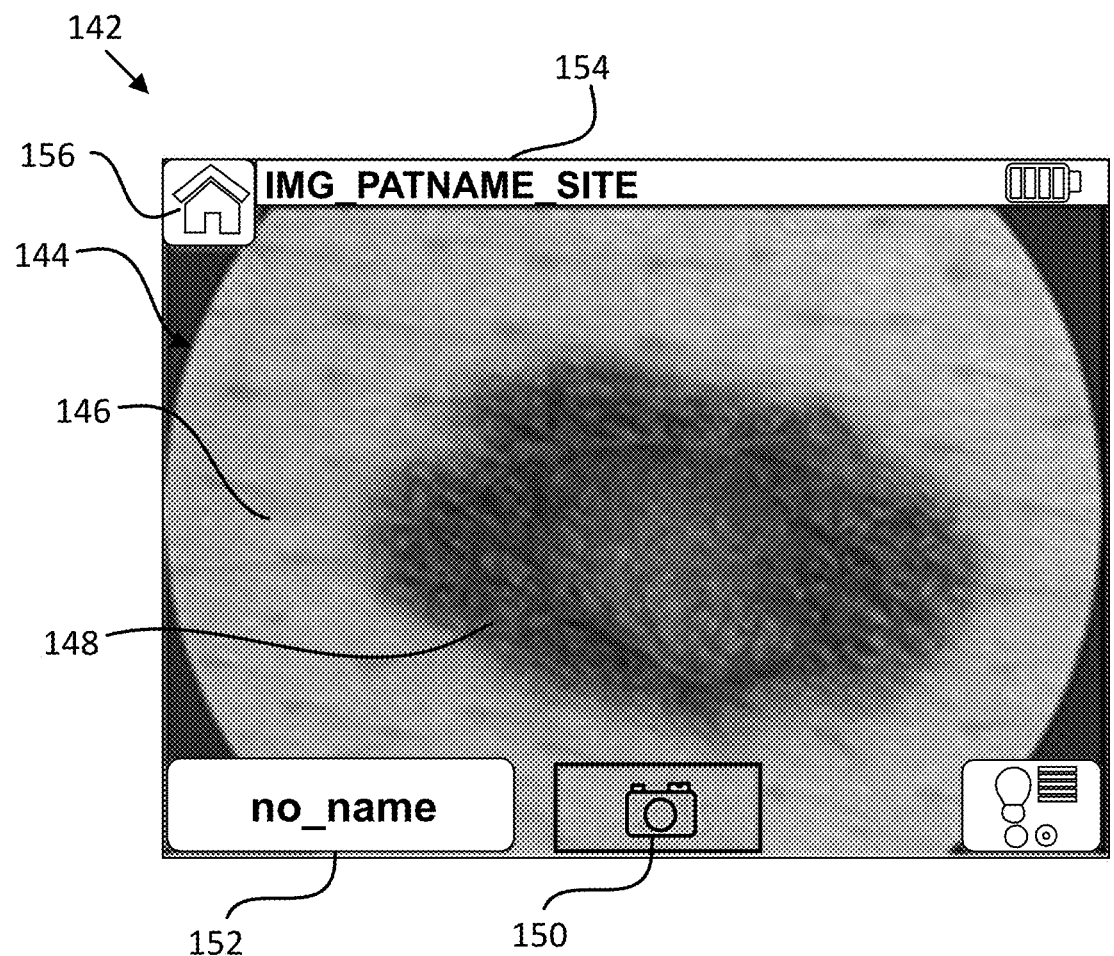
FIG. 14 shows an illustrative image capture display screen that is displayed on a display unit of the dermal imaging system of FIG. 2.

FIG. 14 shows an example of an image capture display screen 142 of the dermal imaging system 100. The image capture display screen 142 is displayed on the display unit 108 during image capture. The image capture display screen 142 includes a display portion 144 that displays a skin surface 146 of the patient P that includes an area of interest 148 such as a mole. As described above, melanomas can develop from moles and can be identified from changes in a mole including an increase in size, irregular edges, color, itchiness, or skin breakdown.

Figure 15:
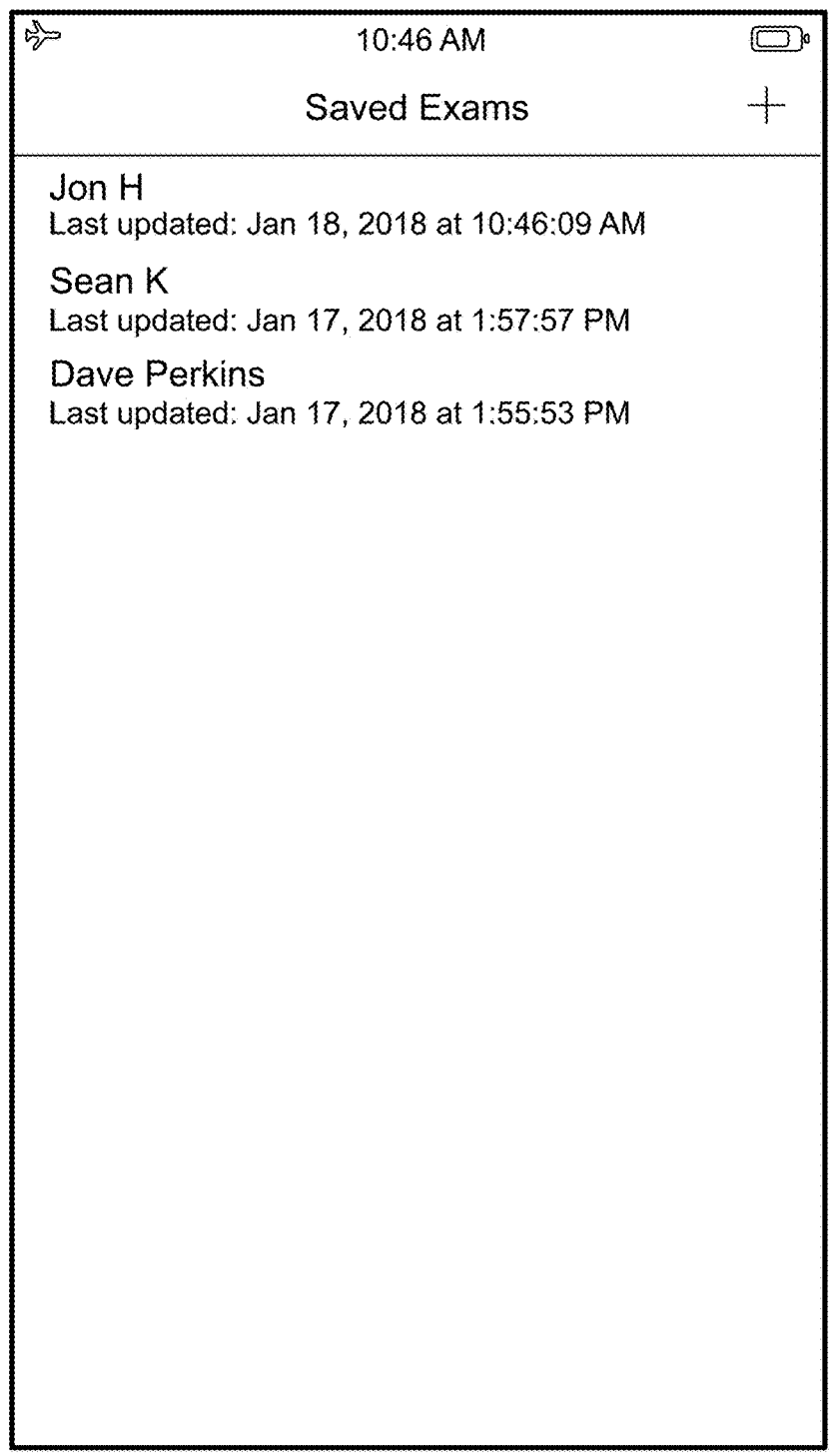
FIG. 15 shows an illustrative saved exams display screen that is displayed on a display unit of the dermal imaging system of FIG. 2.
Figure 16:
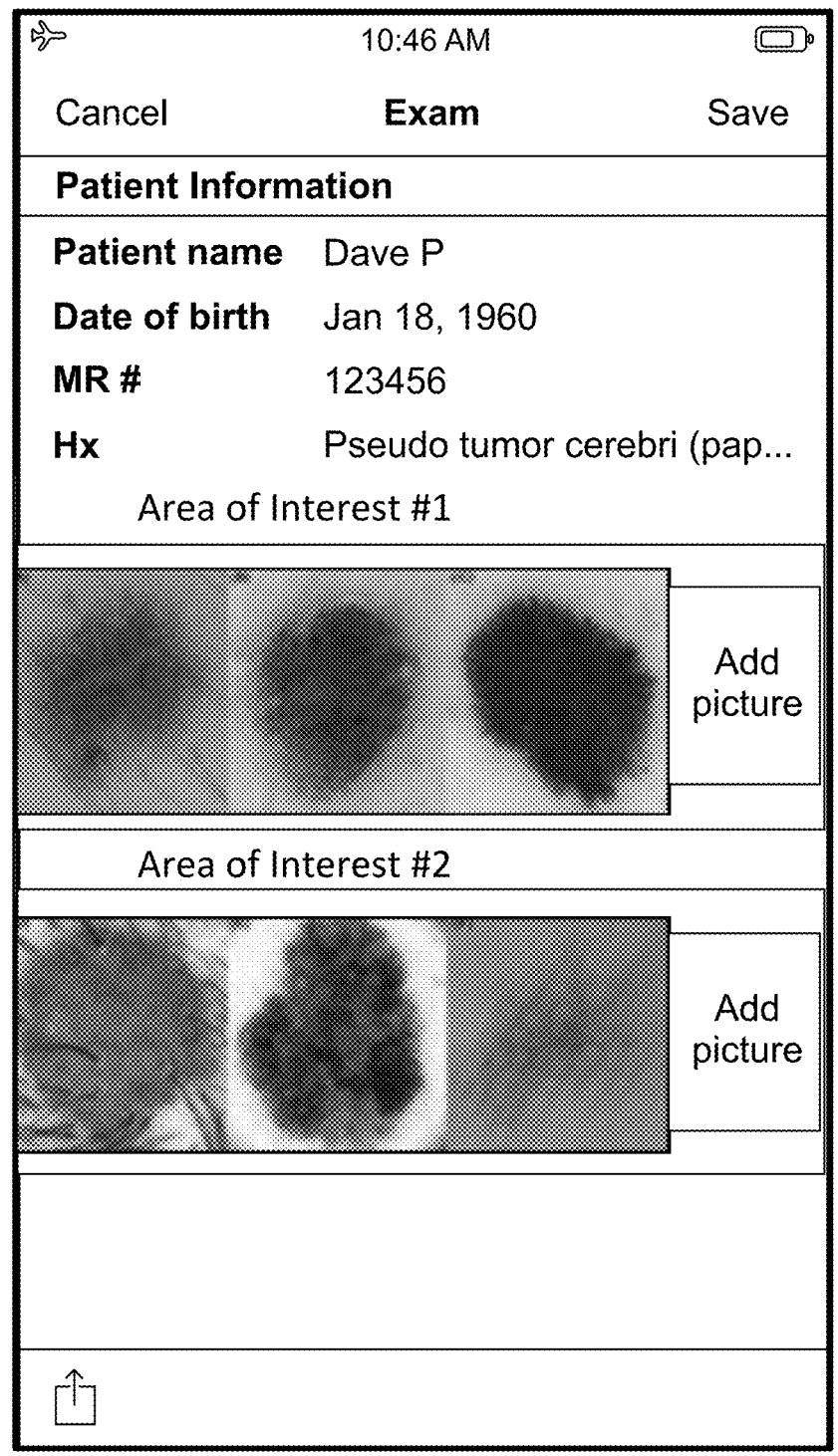
FIG. 16 shows an illustrative exam display screen that is displayed on a display unit of the dermal imaging system of FIG. 2.

In embodiments where the display unit 108 is a finger-operated touchscreen, the image capture display screen 142 includes a capture button 150 that can be pressed by the user U to capture an image of the skin surface 146 that includes the area of interest 148. The image capture display screen 142 has a home button 156 that when pressed by the user U returns the graphical user interface of the display unit 108 to a home screen where the user U may access one or more additional display screens and menus such as a saved exams display screen 160 shown in FIG. 15, and an exam display screen 162 shown in FIG. 16. Additional display screens and menus that can be displayed on the graphical user interface of the display unit 108 are possible.

In some examples, the image capture display screen 142 can include a label 152 that identifies the patient P such as by name, patient ID number, or some other identifier, and a label 154 that identifies the image that is being taken. In some examples, the label 154 includes one or more identifies related to the patient P, user U, or location where the image is being taken.

Figure 17:
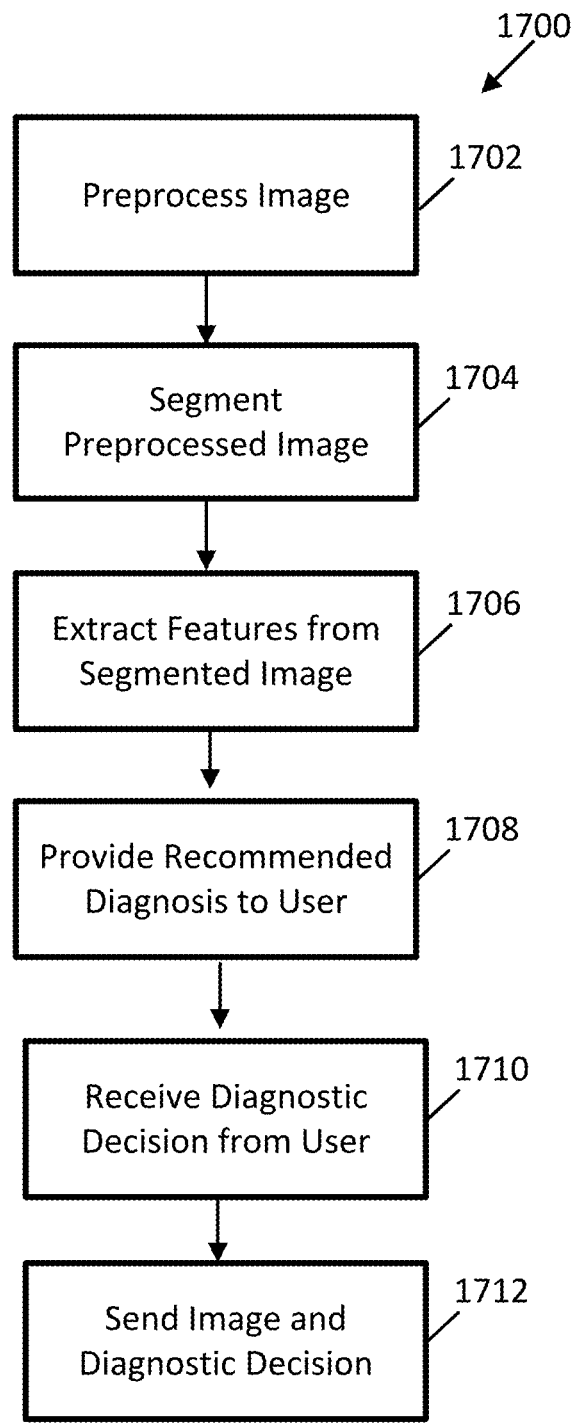
FIG. 17 illustrates a method of performing computer-aided algorithms for skin disease screening.

FIG. 17 illustrates a method 1700 of performing computer-aided algorithms for skin disease screening. In certain embodiments, the method 1700 is performed by the dermal imaging system 100 to provide a recommended diagnosis to the user U. In other embodiments, the method 1700 is performed by the server 300, and the server 300 transmits a recommended diagnosis to the dermal imaging system 100 for the user U to view on the display unit 108 of the dermal imaging system 100. In certain embodiments, the operations performed in the method 1700 are combined with the operations performed in the method 2500 of skin disease screening that will be described in more detail below with reference to FIG. 25.

The recommended diagnosis is determined from an image of a skin lesion of the patient P captured using the camera 106 of the dermal imaging system 100. As an illustrative example, the skin lesion can be a mole such as the area of interest 148 within the skin surface 146 shown in FIG. 14. The recommended diagnosis is determined by the dermal imaging system 100 or server 300 by performing image processing and analysis and by execution of one or more computer-aided algorithms based on the ABCD rule, 3-point checklist, 7-point checklist, CASH (color, architecture, symmetry, homogeneity), Menzies method, or pattern analysis. As described above, the computer-aided algorithms can be enhanced with machine learning, deep learning, or artificial intelligence based on the images stored in the image database 500 (see FIG. 1). The computer-aided algorithms are described in more detail with reference to FIGS. 20-22.

The method 1700 includes an operation 1702 of preprocessing an image of a skin lesion such as an image of the skin surface 146 that includes the area of interest 148 shown in FIG. 14. The preprocessing performed at operation 1702 may include cropping the image to a standard size, performing grayscale conversion by converting the RGB values in the image into grayscale values, smoothening the image, eroding the image to remove objects from the image such as hairs that surround the area of interest 148, and dilating the image by adding pixels to the boundaries of objects in the image such as around the area of interest 148 for edge enhancement.

Figure 18:
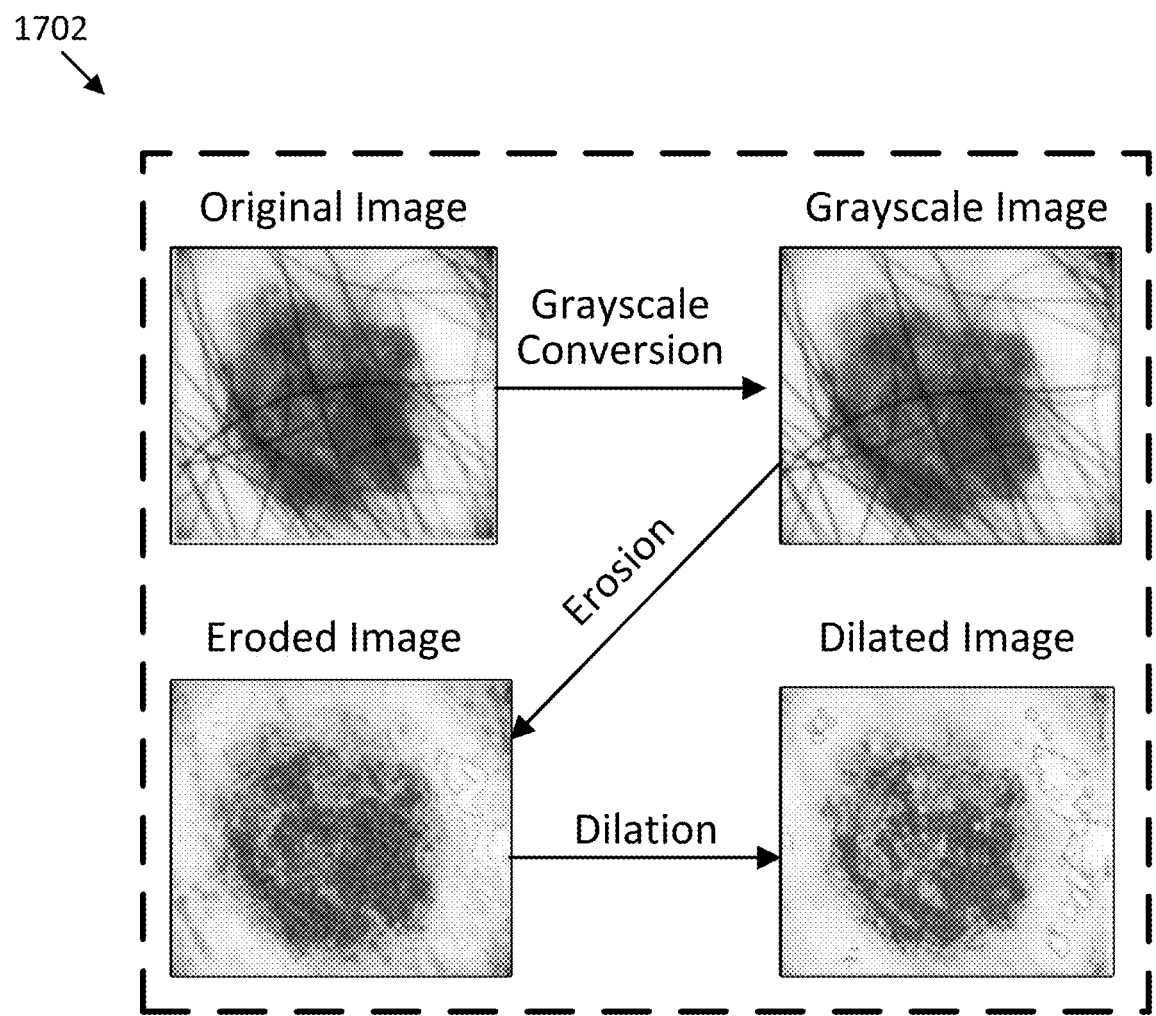
FIG. 18 illustrates a preprocessing operation on an example image.

FIG. 18 illustrates at least some of the preprocessing operations performed on an example image during operation 1702. For example, FIG. 18 illustrates converting the original image into grayscale, eroding the image to remove hairs around an area of interest, and dilating the image to enhance and/or emphasize the edges around the area of interest.

Next, the method 1700 includes an operation 1704 of segmenting the preprocessed image. Operation 1704 may include identifying the boundaries between the area of interest 148 and the skin surface 146 in the preprocessed image, and subsequently partitioning the area of interest 148 from the skin surface 146. In some embodiments, a flood-filling algorithm is performed on the area of interest 148. By segmenting the area of interest 148 from the skin surface 146, the preprocessed image is simplified and easier to analyze.

Figure 19:
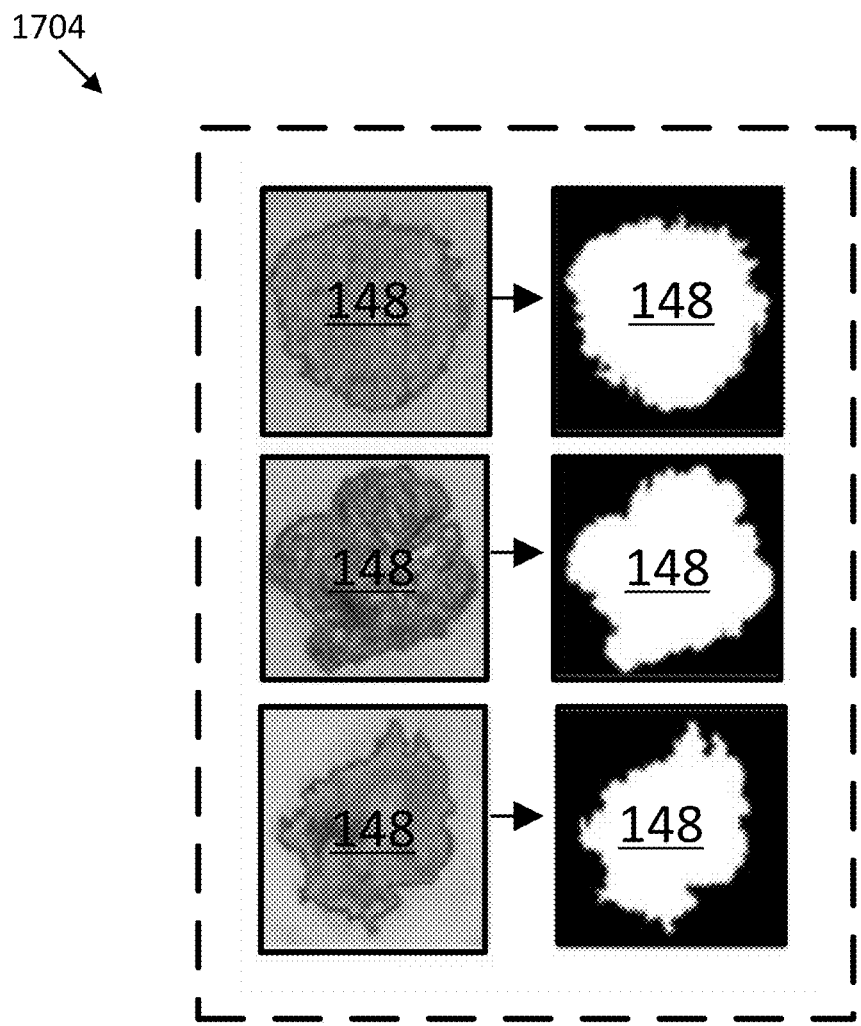
FIG. 19 illustrates a segmenting operation on preprocessed images.

FIG. 19 illustrates segmenting a plurality of preprocessed images that each include an area of interest. For example, FIG. 19 shows on the left side preprocessed images before segmenting, and shows on the right side the preprocessed images after segmenting. In the examples shown in FIG. 19, the segmented portions are areas of interest such as a mole.

Next, the method 1700 includes an operation 1706 of extracting features from the segmented image. Operation 1706 may include extracting features related to the shape, color, and texture of the area of interest 148. Color features may include wavelet coefficients and islands of colors. Additional dermoscopic features may also be extracted from the segmented image. As an illustrative example, the area of interest 148 can be a mole on a skin surface such that the shape, color, and texture of the mole are extracted at operation 1706.

Next, the method 1700 includes an operation 1708 of providing a recommended diagnosis of the area of interest 148 based on the extracted features. As an illustrative example, the recommended diagnosis can be a positive melanoma diagnosis or a negative melanoma diagnosis. Additional recommended diagnoses may be provided for basal cell carcinomas, squamous cell carcinomas, and actinic keratosis. Advantageously, the recommended diagnosis can help aid the user U of the dermal imaging system 100 especially when the user U does not have specialized training in dermatology such as a general practitioner or primary care physician.

The method 1700 further includes an operation 1710 of receiving a diagnostic decision from the user U. The diagnostic decision is made by the user U in view of the recommended diagnosis as well as any other information available to the user U such as the patient P's medical history, family history, and other information. Thus, the diagnostic decision is still ultimately made by the user U of the dermal imaging system 100.

In certain embodiments, the method 1700 may include a further operation 1712 of sending the image of the skin lesion (e.g., the skin surface 146 that includes the area of interest 148) and the diagnostic decision to the specialist S (see FIG. 1) for further analysis. Advantageously, the specialist S can verify the diagnostic decision, prescribe treatment for the skin lesion, schedule a follow up visit for the patient P to conduct further tests, and so on. As described above, the image of the skin lesion can be sent directly to the specialist S using the network 200 such as through email, instant message, or cloud sharing.

Additionally, or alternatively, operation 1712 can include sending the image of the skin lesion (e.g., the skin surface 146 that includes the area of interest 148) and the diagnostic decision to the server 300 (see FIG. 1). Advantageously, the server 300 can store the image of the skin lesion and the diagnostic decision in an electronic medical record 402 of the patient P located in the EMR system 400. Subsequently, the specialist S can access the image of the skin lesion and the diagnostic decision from the server 300 using the network 200. In some examples, the image of the skin lesion may also be stored in the image database 500 so that it can be used in machine learning and/or artificial intelligence to improve the computer-aided algorithms.

Returning back to operation 1708, one or more computer-aided algorithms may be performed by the dermal imaging system 100 or server 300 to provide the recommended diagnosis for the skin lesion. The computer-aided algorithms can be based on the ABCD rule, 3-point checklist, 7-point checklist, CASH (color, architecture, symmetry, homogeneity), Menzies method, and the like. In certain embodiments, the dermal imaging system 100 or server 300 combine the results from multiple algorithms (i.e., ABCD rule, 3-point checklist, 7-point checklist, etc.) to improve the accuracy of the recommended diagnosis. In certain embodiments, multiple images of the patient P's are fed into the computer-aided algorithms to improve the recommended diagnosis. Additionally, in certain embodiments, machine learning and/or artificial intelligence is used to improve the computer-aided algorithms based on the captured images that are fed into the computer-aided algorithms over time. In certain embodiments, the computer-aided algorithms can provide the recommended diagnosis within 0.3 seconds.

Figure 20:
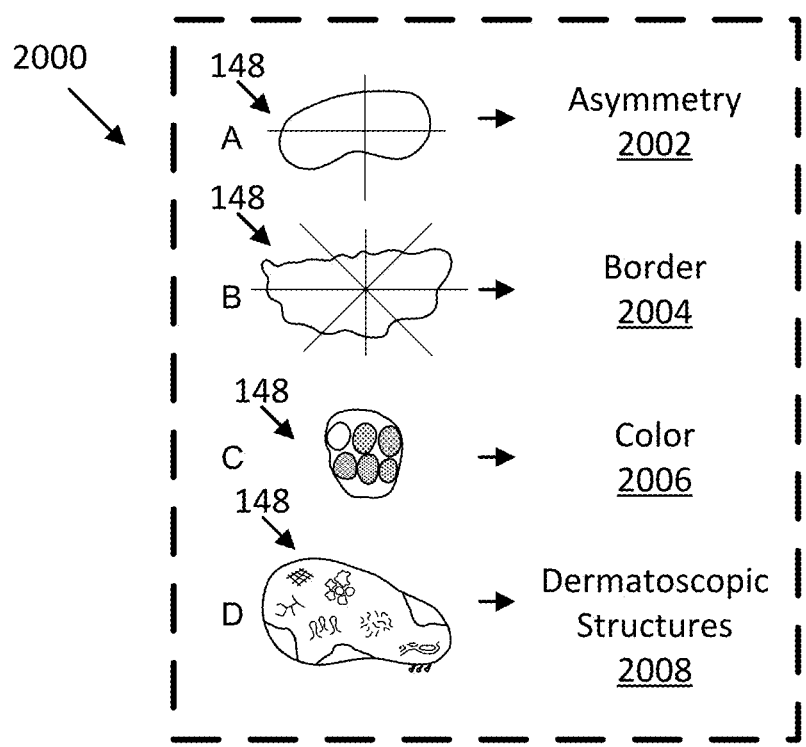
FIG. 20 illustrates an algorithm based on the ABCD rule.

FIG. 20 illustrates an algorithm 2000 based on the ABCD rule that can be performed by the dermal imaging system 100 to provide a recommended diagnosis at operation 1708 of the method 1700. The criteria that combine to create the ABCD rule are an asymmetry criterion 2002, a border criterion 2004, a color criterion 2006, and a dermoscopic structures criterion 2008. The dermal imaging system 100 combines these criteria to calculate a total dermoscopy score (TDS). The recommended diagnosis for the skin lesion (e.g., area of interest 148) is based on the TDS which corresponds to a probability of whether the skin lesion is malignant or not.

In assessing the asymmetry criterion 2002, the area of interest 148 is bisected by two axes that are perpendicular with respect to one another. The asymmetry criterion 2002 looks for both contour asymmetry and the asymmetry in the distribution of dermoscopic colors and structures on either side of each axis. If asymmetry is absent with respect to both axes within the area of interest 148, an asymmetry score A of 0 is provided. If there is asymmetry in only one axis, the asymmetry score A is 1. If there is asymmetry in both axes, the asymmetry score A is 2.

Assessing the border criterion 2004 is based on whether there is a sharp, abrupt cutoff at the periphery of the area of interest 148 or a gradual, indistinct cutoff. In certain embodiments, the area of interest 148 is divided into eight segments. A maximum border score B of eight is given when the entire border (i.e., all eight segments) of the area of interest 148 has a sharp cutoff, a minimum border score B of 0 is given when the border of the area of interest 148 in all eight segments has no sharp cutoffs, and border scores between 0 and 8 are provided based on the number of segments that are identified as having a sharp cutoff.

In alternative examples, the border score B can be based on a calculated compactness of the area of interest 148 or based on a calculated Haussdorf fractal dimension. Additional methods for quantifying border irregularity, and hence calculating a border score B, are possible.

Assessing the color criterion 2006 is based on identifying differently colored pigmentation in the area of interest 148. The presence of each of the following colors counts for 1 point for a color score C: white, red, light brown, dark brown, blue-gray, and black.

Assessing the dermoscopic structures criterion 2008 is based on features such as pigment network (irregular mesh or pigmentation), globules (irregular size and distribution), branched streaks (modified pigment network, abrupt discontinuation), structureless areas (no recognizable structures, milky veil), regression structures (whitish, scar-like depigmentation), and atypical vascular patterns (irregular polymorphous vascular pattern, hairpin vessels, milky red areas). The presence of each structure counts as 1 point for a dermoscopic structures score D.

The asymmetry score A, border score B, color score C, and dermoscopic structures score D are weighted, and then combined to calculate the TDS using the following equation:

$$TDS = (A \times 1.3) + (B \times 0.1) + (C \times 0.5) + (D \times 0.5) \qquad [1]$$

In certain embodiments, a TDS greater than 5.45 is classified by the dermal imaging system 100 as melanoma, a TDS between 5.45 and 4.75 is classified by the dermal imaging system 100 as suspicious, and a TDS less than 4.75 is classified as benign.

Figure 21:
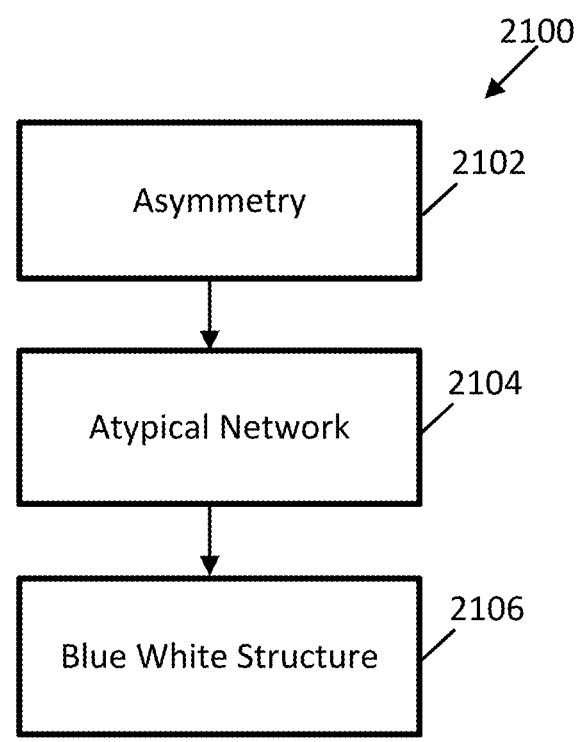
FIG. 21 illustrates an algorithm based on the 3-point checklist.

FIG. 21 illustrates an algorithm 2100 based on the 3-point checklist that can be performed by the dermal imaging system 100 to provide a recommended diagnosis at operation 1708 of the method 1700. The 3-point checklist can distinguish between malignant (i.e. melanoma and pigmented basal cell carcinoma) from benign pigmented skin lesions. The algorithm 2100 applies to the area of interest 148 the following criteria: asymmetry criterion 2102, an atypical network criterion 2104, and a blue white structure criterion 2106.

The asymmetry criterion 2102 is based on the symmetry of contours, structures, and colors in the two perpendicular axes, the atypical network criterion 2104 is based on identifying a pigmented network with thickened lines and irregular distribution, and the blue white structure criterion 2106 is based on identifying any white and/or blue color visible in the area of interest 148, including blue-white veil, scar-like depigmentation, and regression structures such as peppering. The algorithm 2100 based on the 3-point checklist classifies the area of interest 148 as melanoma when two or more of these criteria are identified in the area of interest 148.

Figure 22:
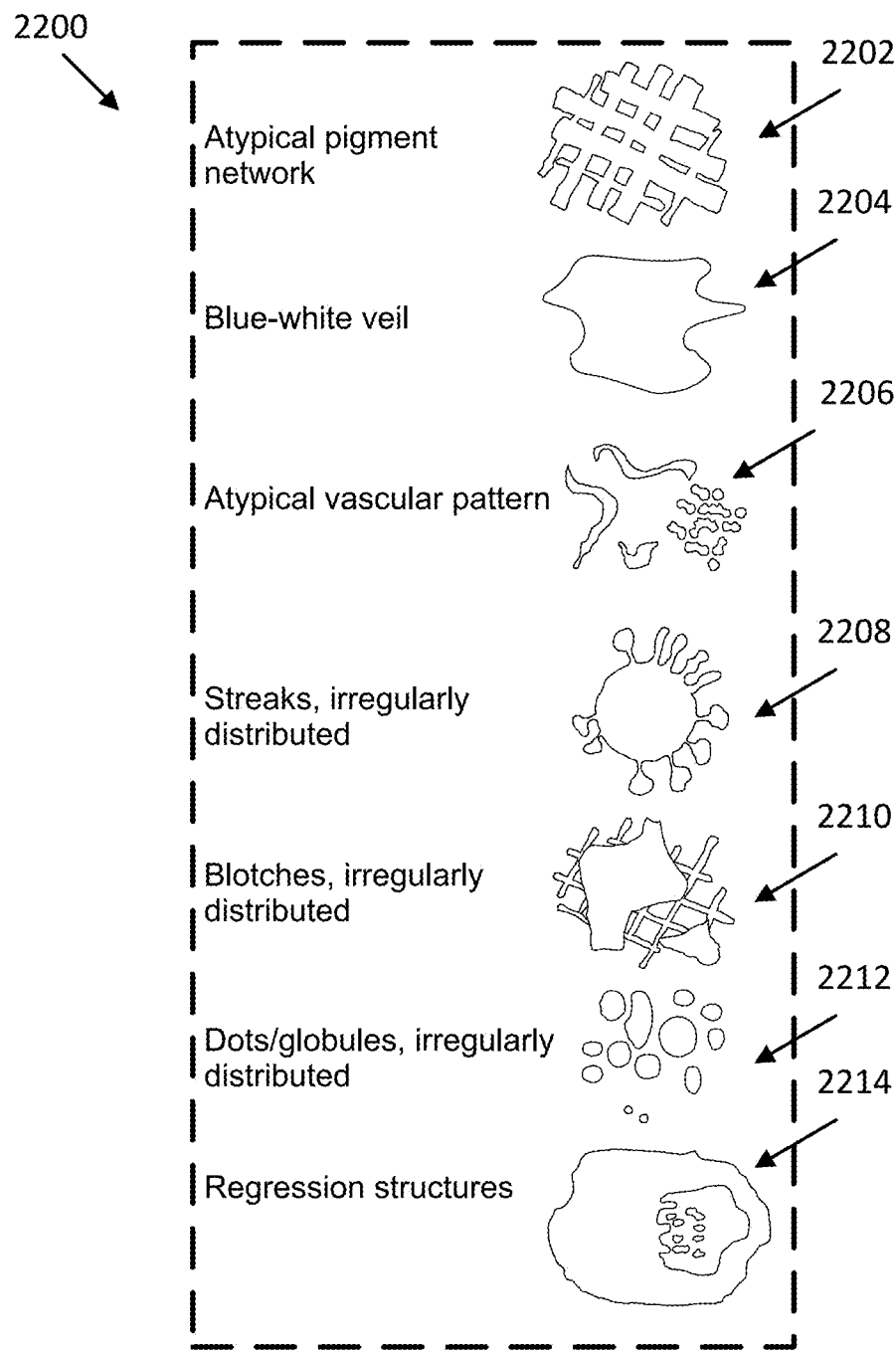
FIG. 22 illustrates an algorithm based on the 7-point checklist.

FIG. 22 illustrates an algorithm 2200 based on the 7-point checklist that can be performed by the dermal imaging system 100 to provide a recommended diagnosis at operation 1708 of the method 1700. The algorithm 2200 applies to the area of interest 148 the following criteria: atypical pigment network 2202, blue-white veil 2204, atypical vascular pattern 2206, irregularly distributed streaks 2208, irregularly distributed blotches 2210, irregularly distributed globules 2212, and regression structures 2214.

At least some of the criteria is weighted as major criteria (atypical pigment network 2202, blue-white veil 2204, and atypical vascular pattern 2206) such that their detected presence counts as 2 points, whereas the remaining criteria are considered as minor criteria (irregularly distributed streaks 2208, irregularly distributed blotches 2210, irregularly distributed globules 2212, and regression structures 2214) such that their detected presence counts as only 1 point. The algorithm 2200 based on the 7-point checklist classifies the area of interest 148 as suspicious when the calculated score is 3 or more such as when at least one minor criterion and one major criterion are detected by the dermal imaging system 100 in the area of interest 148.

In some embodiments, multispectral imaging is performed by the dermal imaging system 100 to improve the detection of melanoma in the area of interest 148. Light penetration in the skin is different for different wavelengths. For example, FIG. 23 illustrates a chart 2300 that shows the penetration of different light wavelengths through layers of skin.

Figure 24:
FIG. 24 illustrates a chart that includes images of skin lesions taken at different light wavelengths.

FIG. 24 shows a chart 2400 that includes images of skin lesions 2402, 2404, and 2406. Each row is a skin lesion, and each column is a wavelength of light used to take the image of the lesion. As depicted in the example illustrated in FIG. 24, the images of the skin lesions are taken with eight different light sources (i.e., each column represents a different light source that emits light at a certain wavelength). Advantageously, the dermal imaging system 100 can identify the criteria utilized by the computer-aided algorithms 2000, 2100, and 2200 through different layers of the area of interest 148 by using different light sources to emit light at different wavelengths through the area of interest 148. This can further improve the accuracy of the recommended diagnosis.

Figure 25:
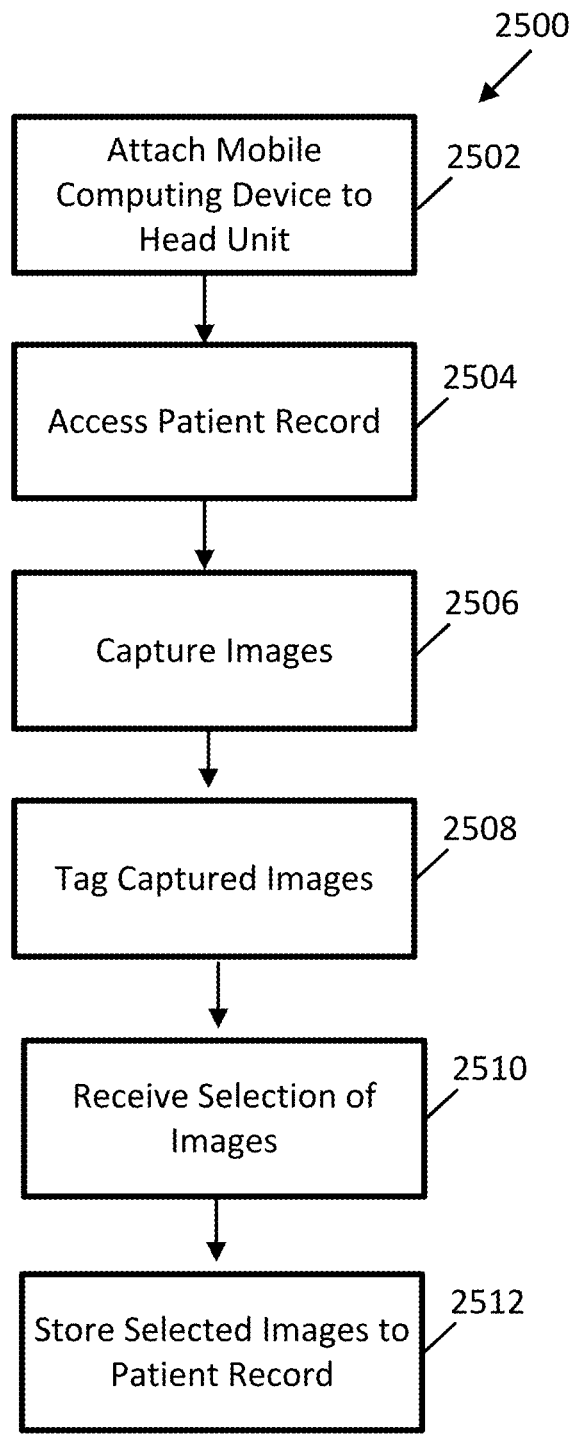
FIG. 25 illustrates a method of skin disease screening.

FIG. 25 illustrates a method 2500 of skin disease screening using the dermal imaging system 100. In certain embodiments, the operations described below with respect to the method 2500 can be combined with the operations described above in the method 1700 of FIG. 17.

In certain embodiments, the method 2500 includes an operation 2502 of attaching a computing device to a head unit such as in the embodiment described above where the head unit 101 detachably mounts to the computing device 103 by the adapter 114 (see FIGS. 3-8). In other embodiments, the method 2500 does not include operation 2502 such as in the embodiment described above where the functions of the head unit 101 and computing device 103 are combined in a single device (see FIGS. 9-13).

Next, the method 2500 includes an operation 2504 of accessing a patient record. For example, the user U can access a patient record of the patient P on the dermal imaging system 100. The patient record can be stored on the server 300 (see FIG. 1). In certain embodiments, the patient record is an electronic medical record 402 or electronic health record of the patient P located in the EMR system 400. The user U can access the patient record using the network 200.

Next, the method 2500 includes an operation 2506 of capturing one or more images of the patient P's skin using the dermal imaging system 100. In certain embodiments, an automated process of capturing a sequence of images is performed during operation 2506. In certain embodiments, the sequence of images is predetermined and includes applying different combinations of light sources 170, illumination angles, and filters 180 (see FIG. 2). In certain embodiments, the dermal imaging system 100 can perform the automated process to capture a sequence of about 900 images in about 30 seconds.

During operation 2506, the controller 110 controls and coordinates the operation of the illumination unit 102, lens 104, and camera 106 to capture the images of the patient P's skin. As described above, the illumination unit 102 includes an array of light sources 170-170+N that are controlled by the controller 110 to flash in a predetermined pattern to capture images under various lighting conditions. Similarly, the lens 104 can include a plurality of filters 180-180+N that are controlled by the controller 110 to apply a predetermined pattern of optical effects on the captured images in coordination with the light sources 170-170+N. The optical effects may include, without limitation, linear polarization, crossed polarization, circular polarization, red-free filter, and high-contrast filter. Additionally, the controller can coordinate the diopter focus of the lens 104 with the light sources 170-170+N and filters 180-180+N.

In certain embodiments, instead of performing an automated process of capturing a sequence of images under different lighting and optical conditions, the user U can control the operation of the dermal imaging system 100 such as with one or more switches to manually select the desired lighting and optical condition for capturing an image of the patient P's skin.

Next, the method 2500 includes an operation 2508 of tagging the captured images. As described above, a sequence of images can be captured by the dermal imaging system 100 under a plurality of different combinations of lighting and optical conditions. Operation 2508 includes automatically tagging each captured image as the images are being captured by the dermal imaging system 100. In certain embodiments, the tags are metadata that is associated with each captured image. In some embodiments, the tags include identifiers to identify the type of light source including the wavelength of the light source and illumination angle, and the optical effects including the type(s) of filters that were used to capture the image. The tags are used to properly identify the images based on the type of lighting and optical effects that were applied to each captured image. Additionally, the tags can include a patient identifier such as a medical record number such that the captured images are associated with the patient P.

The proper identification of the captured images by the tags can aid an automatic analysis of the captured images such as in the method 1700 of performing computer-aided algorithms for skin disease screening that is described above with respect to FIG. 17. In some embodiments, the automatic analysis of the captured images uses machine learning and/or artificial intelligence to provide a recommended diagnosis to the user U of the dermal imaging system 100. Tagging the captured images in operation 2508 can help to identify each captured image based on the light source(s), filter(s), and diopter that were used to capture the image.

In certain embodiments, the method 2500 includes an operation 2510 of receiving a selection of one or more captured images. In certain embodiments, the captured images are displayed on the display unit 108 of the dermal imaging system 100. Subsequently, the user U can scroll through the captured images to manually select an image with the best image quality. Alternatively, the captured images can be automatically selected by the dermal imaging system 100 without input from the user U. For example, the dermal imaging system 100 can perform image quality algorithms to automatically select an image with the best image quality.

In certain embodiments, the images selected in operation 2510 are analyzed by the dermal imaging system 100 using one or more of the computer-aided algorithms described above to provide a recommended diagnosis. Accordingly, the operations of the method 1700 can be performed after a selection of the captured images is received in operation 2510.

Next, the method 2500 includes an operation 2512 of storing the selected images to the patient record. The user U can use the dermal imaging system 100 and the network 200 to store the selected images in the patient record. As described above, the patient record can be stored on the server 300. In certain embodiments, the patient record is an electronic medical record 402 of the patient P located in the EMR system 400. In certain embodiments, in addition to storing the selected images to the patient record, operation 2512 includes storing the recommended diagnosis determined by the method 1700 in the patient record.

In certain embodiments, the selected images are bundled into a group for transfer and image analysis. For example, the tagged images can be transferred to the server 300, and the server 300 can analyzes the selected images using one or more of the computer-aided algorithms described above to provide a recommended diagnosis in accordance with the method 1700.

Figure 26:
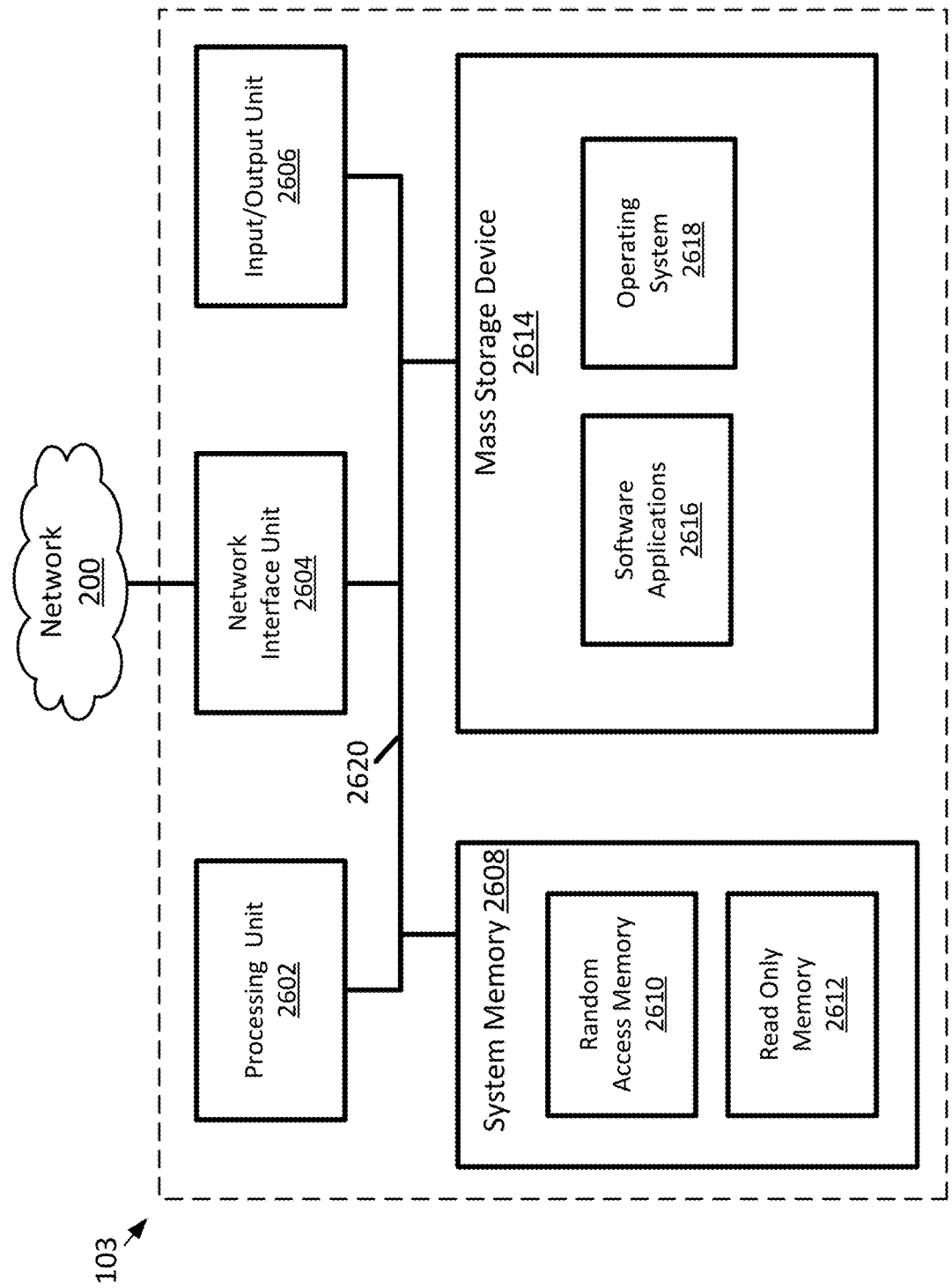
FIG. 26 schematically illustrates an exemplary architecture of a computing device that can be used in the imaging environment of FIG. 1.

FIG. 26 illustrates an exemplary architecture of the computing device 103 which can be used to implement aspects of the present disclosure, such as the functions of the dermal imaging system 100 described above. The computing device 103 includes a processing unit 2602, a system memory 2608, and a system bus 2620 that couples the system memory 2608 to the processing unit 2602. The processing unit 2602 is an example of a processing device such as a central processing unit (CPU). In certain embodiments, the processing unit 2602 is the controller 110 of the dermal imaging system 100.

The system memory 2608 includes a random-access memory ("RAM") 2610 and a read-only memory ("ROM") 2612. A basic input/output logic containing the basic routines that help to transfer information between elements within the computing device 103, such as during startup, is stored in the ROM 2612.

The computing device 103 can also include a mass storage device 2614 that is able to store software instructions and data. The mass storage device 2614 is connected to the processing unit 2602 through a mass storage controller (not shown) connected to the system bus 2620. The mass storage device 2614 and its associated computer-readable data storage media provide non-volatile, non-transitory storage for the computing device 103.

Although the description of computer-readable data storage media contained herein refers to a mass storage device, it should be appreciated by those skilled in the art that computer-readable data storage media can be any available non-transitory, physical device or article of manufacture from which the device can read data and/or instructions. The mass storage device 2614 is an example of a computer-readable storage device.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid-state memory technology, or any other medium which can be used to store information, and which can be accessed by the device.

The computing device 103 may operate in a networked environment using logical connections to remote network devices through the network 200, such as a local network, the Internet, or another type of network. The device connects to the network 200 through a network interface unit 2604 connected to the system bus 2620. The network interface unit 2604 may also be utilized to connect to other types of networks and remote computing systems.

The computing device 103 can also include an input/output controller 2606 for receiving and processing input from a number of input devices. Similarly, the input/output controller 2606 may provide output to a number of output devices.

The mass storage device 2614 and the RAM 2610 can store software instructions and data. The software instructions can include an operating system 2618 suitable for controlling the operation of the device. The mass storage device 2614 and/or the RAM 2610 also store software instructions 2616, that when executed by the processing unit 2602, cause the device to provide the functionality of the device discussed in this document. For example, the mass storage device 2614 and/or the RAM 2610 can store software instructions that, when executed by the processing unit 2602, cause the wearable device to send or receive vital signs measurements.

The various embodiments described above are provided by way of illustration only and should not be construed to be limiting in any way. Various modifications can be made to the embodiments described above without departing from the true spirit and scope of the disclosure.

What is claimed is:

1. A dermal imaging system, comprising:
 a camera;

an illumination unit having an array of light sources, each light source configured to emit light at a predetermined wavelength;

one or more lenses that each selectively apply an optical effect; and a controller configured to control operation of the camera, the illumination unit, and the one or more lenses, the controller having at least one processor, and a memory storing instructions which, when executed by the at least one processor, cause the system to:

coordinate the operation of the illumination unit, the one or more lenses, and the camera to capture a sequence of images of an area of interest on a skin surface, each image in the sequence of images captured using a different combination of a light source selected from the array of light sources and a lens selected from the one or more lenses;

automatically tag each image in the sequence of images, the tag for each image identifying the combination of the light source selected from the array of light sources and the lens selected from the one or more lenses;

automatically select at least one image from the sequence of images based on image quality; and analyze the at least one image selected from the sequence of images to provide a recommended skin disease diagnosis, wherein analyze the at least one image includes using one or more computer-aided algorithms that analyze the at least one image and the tag to provide the recommended skin disease diagnosis.

2. The system of claim 1, wherein the array of light sources include light-emitting diodes, lasers, or optical lamps.

3. The system of claim 1, wherein the memory stores further instructions which, when executed by the at least one processor, cause the system to:

perform multispectral imaging on the area of interest to identify one or more features through the skin surface where the area of interest is located.

4. The system of claim 1, wherein the memory stores further instructions which, when executed by the at least one processor, cause the system to:

adjust an angle of illuminated light from a light source selected from the array of light sources.

5. The system of claim 1, wherein the controller selectively applies one or more optical effects when capturing the sequence of images such that some images are captured with polarization and other images are captured without polarization.

6. The system of claim 1, wherein the one or more lenses include at least one of a linear polarizer, a crossed polarizer, a circular polarizer, a red-free filter, and a high-contrast filter.

7. The system of claim 1, wherein a combination of light source, illumination angle, and optical effect is automatically selected by the controller based on a selected screening for skin disease, or patient characteristics such as age or skin color.

8. The system of claim 1, wherein the recommended skin disease diagnosis is melanoma, basal cell carcinomas, squamous cell carcinomas, or actinic keratosis.

9. The system of claim 1, wherein the memory stores further instructions which, when executed by the at least one processor, cause the system to:

perform image quality algorithms to determine the image quality of the at least one image from the sequence of images.

10. The system of claim 1, wherein the tag for each image in the sequence of images includes metadata that is associated with each image.

* * * * *